United States Patent
Chachad et al.

(10) Patent No.: US 11,321,248 B2
(45) Date of Patent: May 3, 2022

(54) MULTIPLE-REQUESTOR MEMORY ACCESS PIPELINE AND ARBITER

(71) Applicant: Texas Instruments Incorporated, Dallas, TX (US)

(72) Inventors: Abhijeet Ashok Chachad, Plano, TX (US); David Matthew Thompson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/882,503

(22) Filed: May 24, 2020

(65) Prior Publication Data

US 2020/0371970 A1    Nov. 26, 2020

Related U.S. Application Data

(60) Provisional application No. 62/852,404, filed on May 24, 2019, provisional application No. 62/852,411, filed on May 24, 2019.

(51) Int. Cl.
*G06F 13/16*    (2006.01)
*G06F 12/08*    (2016.01)

(52) U.S. Cl.
CPC .......... *G06F 13/1605* (2013.01); *G06F 12/08* (2013.01)

(58) Field of Classification Search
CPC ............. G06F 13/1605; G06F 12/0875; G06F 12/0897; G06F 12/0811
See application file for complete search history.

(56) References Cited

U.S. PATENT DOCUMENTS

| | | | |
|---|---|---|---|
| 5,903,908 A | 5/1999 | Singh et al. | |
| 6,430,654 B1* | 8/2002 | Mehrotra | G06F 12/0859 711/118 |
| 6,895,482 B1* | 5/2005 | Blackmon | G06F 9/3824 710/112 |
| 9,501,411 B2 | 11/2016 | Guthrie et al. | |
| 11,194,617 B2* | 12/2021 | Chachad | G06F 9/30079 |
| 2002/0065988 A1 | 5/2002 | Lasserre et al. | |
| 2015/0019840 A1* | 1/2015 | Anderson | G06F 9/30098 712/206 |
| 2016/0124890 A1* | 5/2016 | Thompson | G06F 13/4252 710/113 |

FOREIGN PATENT DOCUMENTS

| | | |
|---|---|---|
| EP | 1217526 | 6/2002 |
| WO | 2018031149 | 2/2018 |

OTHER PUBLICATIONS

International Search Report for PCT/US2020/034472 dated Aug. 27, 2020.

* cited by examiner

*Primary Examiner* — Brian T Misiura
(74) *Attorney, Agent, or Firm* — Brian D. Graham; Charles A. Brill; Frank D. Cimino

(57) ABSTRACT

In described examples, a coherent memory system includes a central processing unit (CPU) and first and second level caches. The memory system can include a pipeline for accessing data stored in one of the caches. Requestors can access the data stored in one of the caches by sending requests at a same time that can be arbitrated by the pipeline.

21 Claims, 7 Drawing Sheets

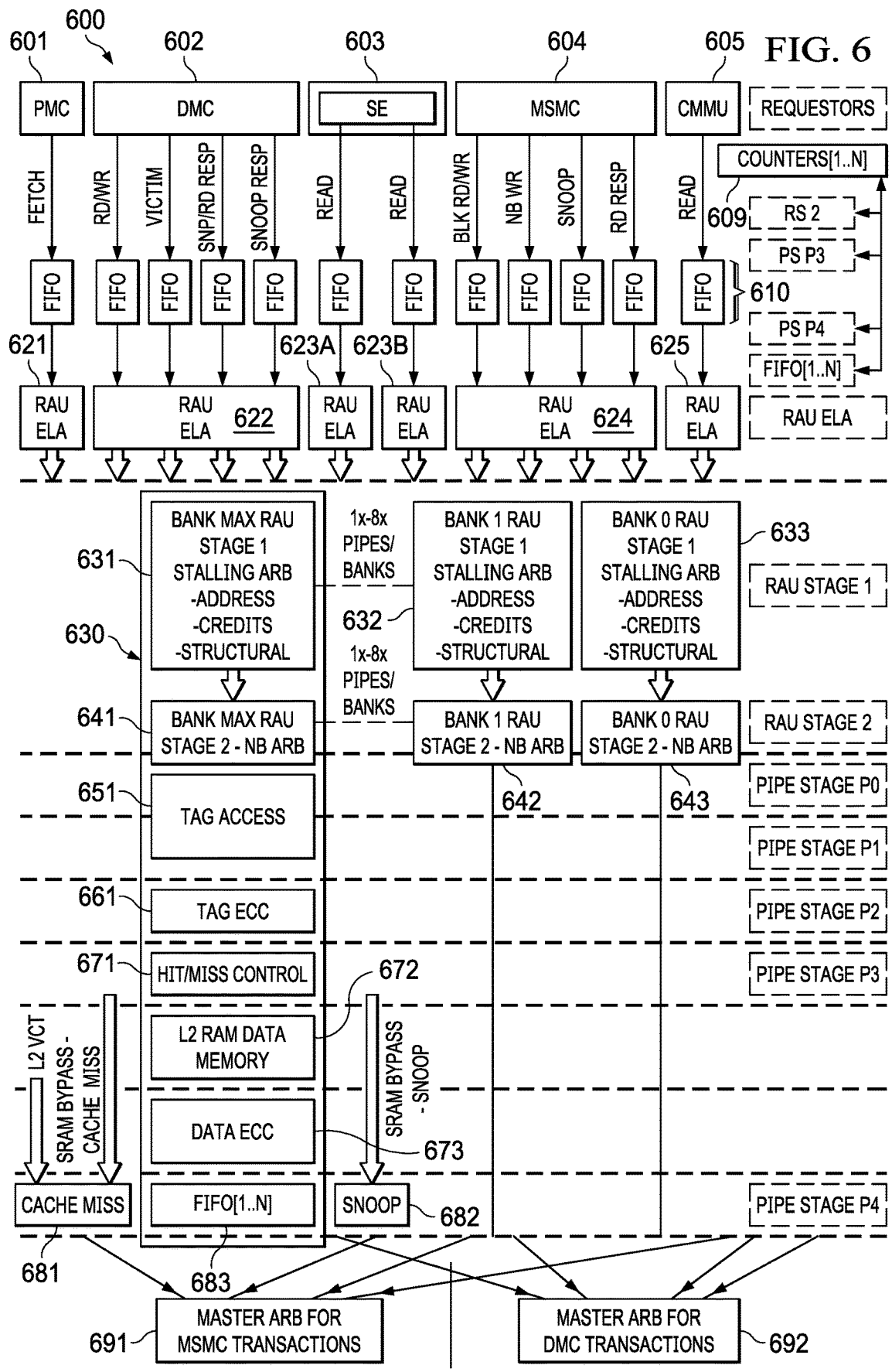

MULTIPLE-REQUESTOR MEMORY ACCESS PIPELINE AND ARBITER

CROSS-REFERENCE TO RELATED APPLICATION

This application claims the benefit of U.S. Provisional Application Nos. 62/852,404 and 62/852,411, both filed May 24, 2019 which are incorporated herein by reference in its entirety and for all purposes.

BACKGROUND

Processing devices can be formed as part of an integrated circuit, such as a part of a system on a chip (SoC). In some examples, the SoC includes at least one central processing unit (CPU), where each CPU of the SoC is coupled to an integrated (e.g., shared) memory system. The memory system can include, for example, a multi-level cache memory (e.g., static RAM-SRAM-formed on the integrated circuit of the SoC) and at least one main memory (e.g., dynamic RAM-DRAM and/or DDR-memory that can be external to the integrated circuit of the SoC).

Increasingly complex memory architectures continue to provide scalability challenges when adding (or coupling) increasingly powerful CPUs to a processing device. The scalability challenges remain, and can become even greater, when multiple CPUs share a common address space of a memory system. Portions of the common address space of shared memory can include various levels of coherent cache (e.g., where various levels can contain different memories for storing data having a unique address).

In one example, a CPU in a cached memory system can consume an entire cache line every 4 cycles, which places additional processing demands of a cache designed to coherently share stored cache information between various CPUs. Such latencies can be lengthened when a cache is configured to protect certain areas of cache memory from being read or altered by at least one CPU that would otherwise be permitted to access lines of cache. Increasing the data security of such systems can require increased processing power and/or more efficient processing architectures.

SUMMARY

In described examples, a coherent memory system includes a central processing unit (CPU) and first and second level caches. The memory system can include a pipeline for accessing data stored in one of the caches. Requestors can access the data stored in one of the caches by sending requests at a same time that can be arbitrated by the pipeline.

BRIEF DESCRIPTION OF THE DRAWINGS

FIG. 6 is a flow diagram of an example banked, selectively blocking cache controller pipeline having reservation-based arbitration and scheduling of cache transactions.

DETAILED DESCRIPTION

Figure 1:
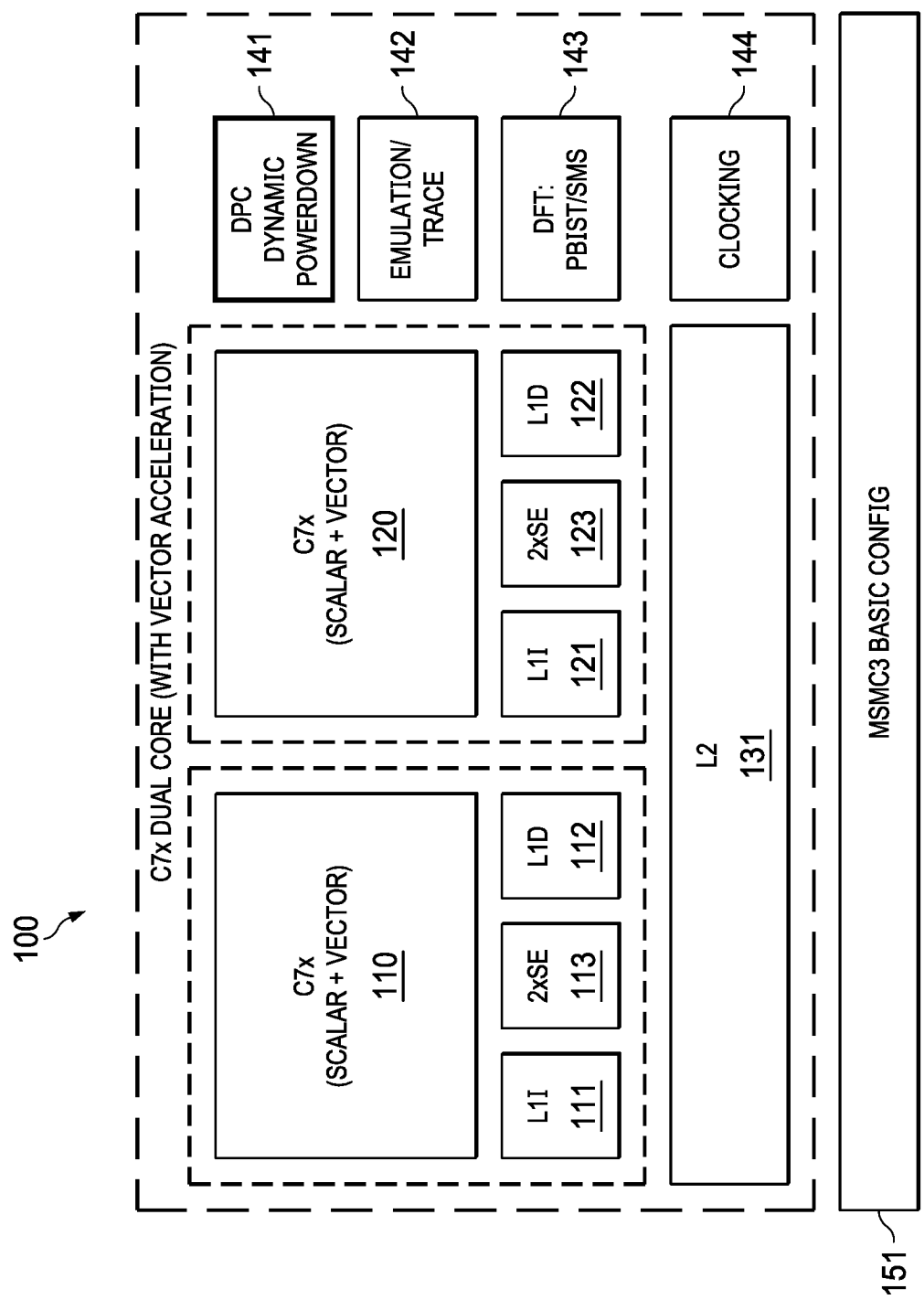
FIG. 1 is a high-level system diagram showing an example dual core scalar/vector processor formed as a system-on-chip.

In the drawings, like reference numerals refer to like elements, and the various features are not necessarily drawn to scale.

A processing device can be formed as part of an integrated circuit, such as a system on a chip (SoC). As described hereinbelow, the processing device can include example security features for protecting security of data in a memory system (such as a multi-level cache system).

FIG. 1 is a high-level system diagram showing an example dual core scalar/vector processor formed as a system-on-chip. SoC 100 is an example dual core scalar and/or vector processor that includes a central processing unit (CPU) 110 core. The CPU 110 core includes a level one instruction cache (L1I) 111, a level one data cache (L1D) 112, and a streaming engine (SE) 113 such as a dual streaming engine (2×SE). The SoC 100 can further include an optional CPU 120 core, which includes a level one instruction cache (L1I) 121, a level one data cache (L1D) 122, and a streaming engine 123. In various example, the CPU 110 core and/or CPU 120 core can include a register file, an arithmetic logic unit, a multiplier, and program flow control units (not specifically shown), which can be arranged for scalar and/or vector processing. The SoC 100 includes a level two unified (e.g., combined instruction/data) cache (L2) 131 that is arranged to selectively cache both instructions and data.

In an example, the CPU 110, level one instruction cache (L1I) 111, level one data cache (L1D) 112, streaming engine 113, and level two unified cache (L2) 131 are formed on a single integrated circuit. In an example, the scalar central processing unit (CPU) 120 core, level one instruction cache (L1I) 121, level one data cache (L1D) 122, streaming engine 123, and level two unified cache (L2) 131 are formed on a single integrated circuit that includes the CPU 110 core.

In an example, the SoC 100 is formed on a single integrated circuit that also includes auxiliary circuits such as dynamic power control (DPC) powerup/powerdown circuit 141, emulation/trace circuits 142, design for test (DFT) programmable built-in self-test (PBIST) and serial message system (SMS) circuits 143, and clocking circuit 144. A memory controller (e.g., a multicore shared memory controller level 3, "MSMC3") 151 is coupled the SoC 100 and can be integrated on the same integrated circuit as the SoC 100. The MSMC3 can include memory access functions such as direct memory access (DMA), so that the MSMC3 can function as (or function in cooperation with) a DMA controller.

CPU 110 operates under program control to execute data processing operations upon data stored in a memory system (e.g., that includes memory shared by multiple cores). The program for controlling CPU 110 includes of a plurality of instructions that are fetched before decoding and execution by the CPU 110.

The SoC 100 includes a number of cache memories. In an example, the level one instruction cache (L1I) 111 stores instructions used by the CPU 110. CPU 110 accesses (including attempting to access) any of the plurality of instructions from the level one instruction cache 111. Level one data cache (L1D) 112 stores data used by CPU 110. CPU 110 accesses (including attempting to access) any addressed data (e.g., any data pointed-to by any of the plurality of instructions) from level one data cache 112. The level one caches (e.g., L1I 111, L1D 112, and 2×SE 113) of each CPU (e.g., 110 and 120) core are backed by a level two unified cache (L2) 131.

In the event of a cache miss of any memory request to a respective level one cache, the requested information (e.g., instruction code, non-stream data, and/or stream data) is sought from the level two unified cache 131. In the event the requested information is stored in level two unified cache 131, the requested information is supplied to the requesting level one cache for relaying the requested information to the CPU 110. The requested information can be simultaneously relayed to both the requesting cache and CPU 110 to reduce access latency to the CPU 110.

The streaming engines 113 and 123 can be similar in structure and operation. In SoC 100, the streaming engine 113 transfers data from level two unified cache 131 (L2) to the CPU 110. Streaming engine 123 transfers data from level two unified cache 131 to the CPU 110. In the example, each streaming engine 113 and 123 controls (and otherwise manages) up to two data streams.

Each streaming engine 113 and 123 is arranged to transfer data of a defined type (e.g., defined structure and/or protocol), where the data is transferred as a stream. A stream includes a sequence of elements of a selected, defined type. Programs that operate on (e.g., consume) streams are instantiated (e.g., configure a processor as a special-purpose machine) to read the included data sequentially and to process each element of the data in turn.

In an example, the stream data includes an indication of defined beginning and ending in time (e.g., where the indication can be used to determine a respective beginning and/or ending point in time). The stream data include elements that generally are of a fixed element size and type throughout the stream. The stream data can include a fixed sequence of elements where programs cannot seek randomly seek elements included within the stream. In an example, stream data is read-only while active, so that programs cannot write to a stream while simultaneously reading from the stream.

When a stream is opened by an example streaming engine, the streaming engine: calculates the address; fetches the defined data type from level two unified cache; performs data type manipulations; and delivers the processed data directly to the requesting programmed execution unit within the CPU. The data type manipulations can include manipulations such as zero extension, sign extension, and data element sorting/swapping (e.g., matrix transposition).

In various examples, the streaming engines are arranged to execute real-time digital filtering operations on defined data types (e.g., well-behaved data). Such engines reduce memory access times (e.g., otherwise encountered by the requesting processor), which frees the requesting processor to execute other processing functions.

In various examples, the streaming engines increase operational efficiency of the level one cache. For example, a streaming engine can minimize the number of cache miss stalls because the stream buffer can bypass the L1D cache (e.g., 111). Also, a streaming engine can reduce the number of scalar operations otherwise required to maintain a control loop and manage the respective address pointers. The stream engines can include hardware memory address generators which reduces the software execution otherwise encountered (e.g., which frees the CPU to perform other tasks) when generating addresses and managing control loop logic.

The level two unified cache 131 is further coupled to higher level memory system components via memory controller 151. The memory controller 151 handles cache misses occurring in the level two unified cache 131 by accessing external memory (not shown in FIG. 1). The memory controller 131 is arranged to control memory-centric functions such as cacheability determination, error detection and correction, and address translation.

The example SoC 100 system includes multiple CPUs 110 and 120. In systems that include multiple CPUs, the memory controller 151 can be arranged to control data transfer between the multiple CPUs and to maintain cache coherence among processors that can mutually access an external memory.

Figure 2:
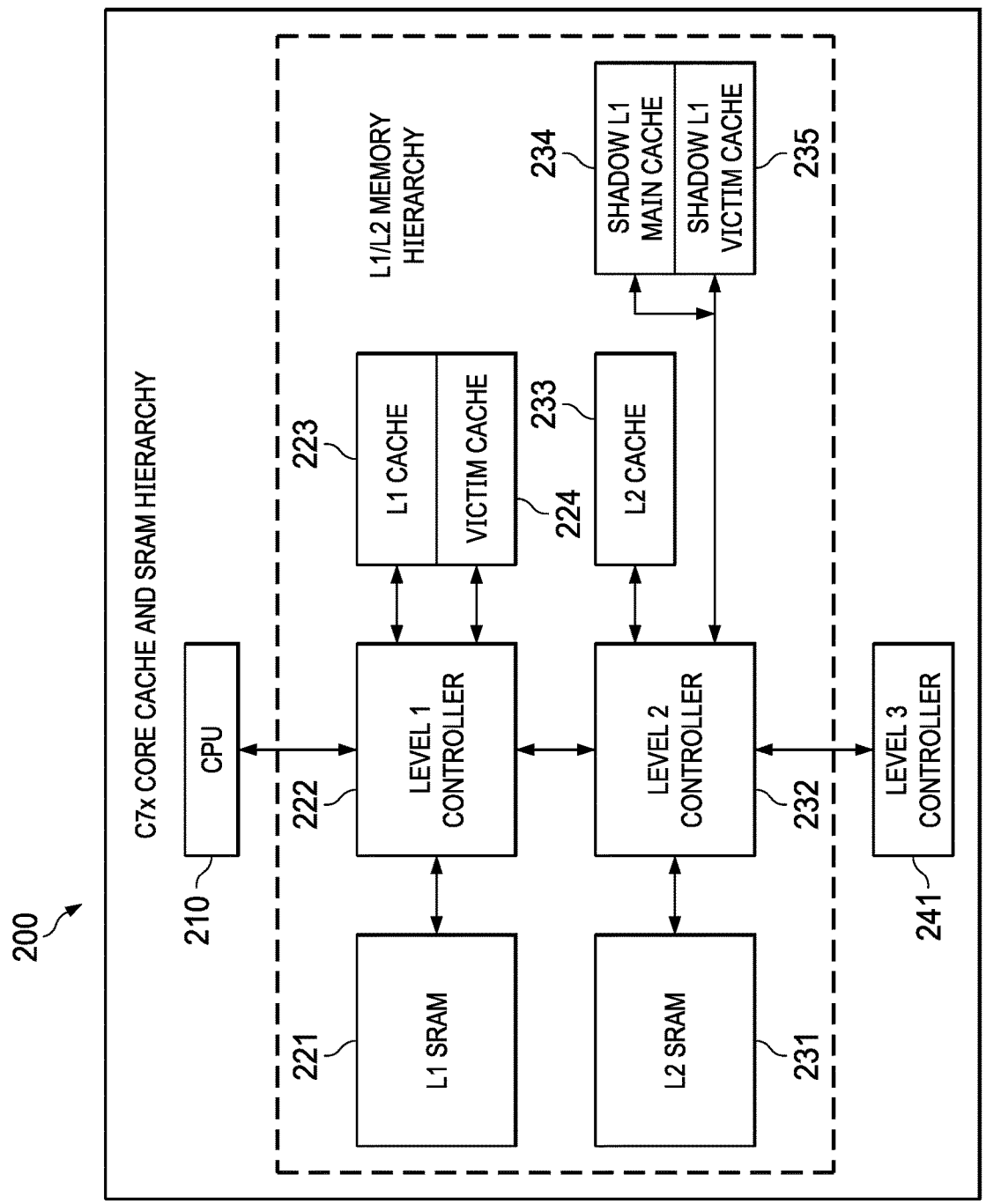
FIG. 2 is a high-level diagram showing levels of an example hierarchical memory system.

FIG. 2 is a high-level diagram showing levels of an example hierarchical memory system. Memory system 200 is an example hierarchical memory system that includes a CPU 210 and controllers (e.g., 222, 232, and 241) for maintaining memory coherence of three respective levels of caching and memory. A first level cache (e.g., L1 data cache) includes L1 SRAM (static ram) 221, level 1 controller 222, L1 cache tags 223, and victim cache tags 224. The first level cache includes memory accessible by the CPU 210 and is arranged to temporarily store data on behalf of the CPU 210, for example. A second level cache (e.g., L2 unified cache) includes L2 SRAM 231, level 2 controller 232, L2 cache tags 233, shadow L1 main cache tags 234, and shadow L1 victim cache tags 234. The second level cache includes memory accessible by the CPU 210 and is arranged to temporarily store data on behalf of the CPU 210, for example. The memory system 200 is coherent throughout and the memory regions of the various levels of cache can include local memory (e.g., including cache lines) that is/are addressable by the CPU. Table 1 shows different memory regions present in the memory system 200, and whether each memory region can be configured as coherent.

TABLE 1

| Region | Description | Coherent/Cacheable status |
|---|---|---|
| L1 SRAM | Attached SRAM for the Level 1 controller | Non-cacheable, inherently coherent because all reads/writes go to the |
| L2 SRAM | Attached SRAM for the Level 2 controller | Cacheable in L1D. Coherent between the following masters: I/O (DMA, non-caching), Streaming Engine (non-caching), MMU (non-caching), L1D (caching). L2 can initiate snoop transactions to L1D as it determines |

TABLE 1-continued

| Region | Description | Coherent/Cacheable status |
|---|---|---|
| L3 SRAM | Attached SRAM for the Level 3 controller | Cacheable in L1D and L2. Coherent between different modules. L2 enforces coherence snoop transactions initiated by L3. L2 can initiate snoop transactions to L1D as it determines necessary. |
| External memory/DDR | Memory port attached to Level 3 controller | Cacheable in L1D and L2. Coherent between different modules. L2 enforces coherence snoop transactions initiated by L3. L2 can initiate snoop transactions to L1D as it determines necessary. |

The CPU 110 is bidirectionally coupled to the level 1 controller 222, which is bidirectionally coupled in turn to the level 2 controller 232, which in turn is bidirectionally coupled to the level 3 controller 234, so that at least three levels of cache memory are coupled to the CPU 210. Data transfers into and out of L1 SRAM 221 cache memory is controlled by level 1 controller 222. Data transfers into and out of L2 SRAM 231 cache memory is controlled by level 2 controller 232.

The level 1 controller 222 is coupled to (and in some examples includes) the L1 cache tags 332 and the victim cache tags 224. The L1 cache tags 223 are non-data parts of respective L1 cache lines, which have respective data stored in the SRAM 221 cache memory. The L1 victim cache tags (e.g., stored in tag ram) 224 are non-data parts of cache lines, where each cache line includes a respective line of data stored in the SRAM 221 cache memory. In an example, cache lines evicted from the L1 cache are copied into the victim cache, so that, for example, the L1 cache tags 223 are copied into (or otherwise mapped into) the L1 victim cache tags 224. The victim cache can, for example, store the otherwise evicted data at the L1 level, so that a memory request by the CPU 210 that "hits" the line stored in the victim cache can be responded to without having to access the L2 level cache (e.g., so that access times are reduced in such cases).

The level 2 controller 232 is coupled to (e.g., includes) two sets of cache tags. A first set of cache tags includes L2 cache tags 233, where are non-data parts of respective L2 cache lines, and where each cache line includes a respective line of data stored in the SRAM 231 cache memory. The second set of cache tags includes the shadow L1 main cache tags 234 and the shadow L1 victim cache tags 235. The shadow L1 main cache tags 234 generally correspond to (e.g., point to or include the same information as) the L1 cache tags 223. The shadow L1 victim cache tags 235 generally correspond to (e.g., point to or include the same information as) the L1 victim cache tags 224. The shadow L1 main cache tags 234 include at least the valid and dirty status of the corresponding cache lines in L1 cache tags 223, while the shadow L1 victim cache tags 235 include at least the valid and dirty status of the corresponding cache lines in L1 victim cache tags 224.

The level 2 controller 232 generates snoop transactions to maintain (e.g., including updating and achieving) read and write coherence of the second level cache with the state of the first level cache. For example, the level 2 controller 232 sends snoop transactions to the level 1 controller to determine the status of L1D cache lines and updates the shadow tags (e.g., 234 or 235) that pertain to the L1D cache lines being queried. The shadow tags (e.g., 234 or 235) can be used only for snooping transactions that are used to maintain L2 SRAM coherency with the level one data cache. In an example, updates for all cache lines in higher level caches can be ignored to increase the efficiency of the L1-to-L2 cache interface.

In response to the snoop request data returned by the level 1 controller 222, the level 2 controller 232 updates the shadow tags (e.g., 234 or 235) that correspond to the L1 cache lines being snooped. Events for which updates are executed include events such as allocation of L1D cache lines and such as dirty and invalidate modifications to data stored in L1 SRAM 221.

Hardware cache coherence is a technique that allows data and program caches in different groups called "shareability domains" (e.g., shared across different CPUs, or even within a single CPU), as well as different requestors (including those that might not include caches) to have permission to access (e.g., read) the most current data value for a given address in memory. Ideally, this "coherent" data value is required to be accurately reflected to every observer in the shareability domain. An observer can be a device such as a cache or requestor that issues commands to read a given memory location.

Through the use of memory attributes, certain memory locations can be marked as "shareable", and others can be marked as "non-shareable." To maintain complete coherency in an ideal system, only the shareable memory regions (e.g., where a region can be one or more contiguous locations) need be kept coherent between the caches/requestors (observers) that are part of a same shareability domain. Coherency for non-shareable memory locations need not be maintained. Described hereinbelow are methods and apparatus arranged to efficiently achieve coherency for the shareable memory regions. When a shareable memory region is coherent, it is shareable, for example, because all of the data locations of the shareable memory region have the most current value of the data assigned to each location of the shareable memory region.

Described hereinbelow are techniques, control logic, and state information of an example functionally correct coherent system. Each observer can issue read (and optionally write) requests to locations that are marked shareable. Moreover, caches can also have snoop requests issued to them, requiring their cache state to be read, returned, or even updated, in response to a type of the snoop operation.

In a multi-level cache hierarchy, the middle levels of the cache hierarchy (e.g. L2) are able to both send and receive snoop operations (e.g., to maintain coherency between the different levels of the cache). In contrast, the first level of a cache hierarchy (e.g. level 1 controller 222) receives snoop operations but does not dispatch snoop operations. Moreover, the last level of the cache hierarchy (e.g. the level 3 controller 241) can dispatch snoop operations but does not receive snoop operations. Generally, snoop operations are intrinsically dispatched in a higher cache levels to lower cache levels withing a cache hierarchy (e.g., where lower represents cache structures closer to the CPU processing element and higher represents cache structures farther away from the CPU processing element).

The level 2 controller 232 includes hardware, control logic, and state information for accurately querying, determining, and processing the current state of coherent (shareable) cache lines in the level 1 cache (e.g., L1D 112), where the lower-level cache is arranged as a heterogeneous cache system. In an example, the level 1 controller 222 manages a heterogeneous cache system that includes a main cache (e.g., set associative) and a victim cache (e.g., fully associative).

The coherence of the memory system 200 can be enforced by recording the status of each cache line of the caches of each cache line using a MESI (modified-exclusive-shared-invalid) Coherence scheme (including derivatives thereof). The standard MESI cache coherence protocol includes the four states: modified, exclusive, shared, invalid (or derivatives thereof) for each cache line.

The Modified state indicates that values in the respective cache line are modified with respect to main memory, and that the values in the cache line are held exclusively in the current cache. The Modified state indicates that the values in the line are explicitly not present or not valid in any other caches in the same shareability domain.

The Exclusive state indicates that the values in the respective cache line are not modified with respect to main memory, but that the values in the cache line are held exclusively in the current cache. This indicates that the values in the line is explicitly not present or not valid in any other caches in the same shareability domain.

The Shared state indicates that the values in the respective cache line are not modified with respect to main memory. The values in the cache line can be present in multiple caches in the same shareability domain.

The Invalid state indicates that any values in the respective cache line are to be treated as if they are not present in the cache (e.g., as a result of being invalidated or evicted).

A shareability domain can be defined as a collection of caches that must remain coherent with one another. Not all MESI states are necessarily required to implement a coherent system with multiple levels of cache hierarchy. For example, the shared state can be eliminated (e.g., at the cost of performance), which results in a MEI coherence system. In an MEI coherent system, exactly one cache in the entire system can hold a copy of each MEI cache line at a given time, regardless of whether the cache line is modified (or could be modified in the future).

The unit of coherence in a coherent cache system is a single cache line, so that length of data (e.g., the number of addresses for accessing the data within a cache line, whether 32, 64, or 128 bytes) is treated as an atomic unit of coherence. In the example system 300 (described hereinbelow with respect to FIG. 3), the caching mechanism shared between L1D and L2 includes a unit of coherence of 128 bytes. Generally, the structures and tracking mechanisms of the first and second levels of cache operate on the selected unit of coherence in an atomic manner.

Various coherency transactions can be initiated for the purpose of maintaining cache coherency. Such coherency transactions include transaction types such as Read, Write, Snoop, Victim. Each transaction type can have multiple forms/variants, which are included by the bus signaling protocol (such as the VBUSM.C protocol specification).

A Read coherency transaction includes returning the "current" (e.g., most recent) value for the given address, whether that value is stored at the endpoint (e.g., in external memory), or in a cache in the coherent system.

A Write coherency transaction includes updating the current value for the given address, and invalidating copies stored in caches in the coherent system.

A Cache maintenance operation (CMO) includes operations that initiate an action to be taken in the coherent caches (L1D and L2) for a single address.

A Snoop coherency transaction ("Snoop") includes reading, invalidating, or both reading and invalidating copies of data stored in caches. Snoops are initiated by a higher level controller of the hierarchy to a cache at the next lower level of the hierarchy. The snoops can be further propagated by the controller of a lower level cache to even lower levels of the hierarchy as needed to maintain coherency.

A Victim coherency transaction includes sending a victim cache line ("Victim") from a lower level cache in the hierarchy to the next higher level of the cache hierarchy. Victims are used to transfer modified data up to the next level of the hierarchy. In some situations, victims can be further propagated up to higher levels of the cache hierarchy. In an example situation where the L1D sends a victim to L2 for an address in the DDR or L3 SRAM, and the line is not present in the L2 cache, the L2 controller is arranged to forward the victim to the next level of the cache hierarchy.

Table 2 describes example coherent commands that can be initiated between L2 and the various masters that interact with the L2 cache.

TABLE 2

| Master | Master-initiated | L2-initiated |
|---|---|---|
| PMC | Read | none |
| MMU | Read | none |
| Streaming Engine (SE) | Read, CMO | none |
| DMC | Read, Write, Victim | Snoop |
| MSMC (L3 controller) | Snoop, DMA Read, DMA Write | Read, Write, Victim |

The level 2 controller 232 maintains local information (e.g., in the level 2 shadow tags) that is updated to reflect each change of the monitored state information that occurs within the hardware FIFOs, RAMs, and logic within the first level cache, so that the current (e.g., most recent) state of all coherent cache lines present in both the main cache and victim cache in the L1 controller can be determined locally at the level 2 cache. Pipelined hardware on a dedicated bus between the level 1 cache and the level 2 cache can increase the speed of keeping the level 2 shadow registers updated and reduce the demand for the bidirectional data access bus that is used to read and write data between the level 1 cache and the level 2 cache. Accurately updating the shadowed information maintains the correct data values and functionality of a coherent hardware cache system.

Figure 3:
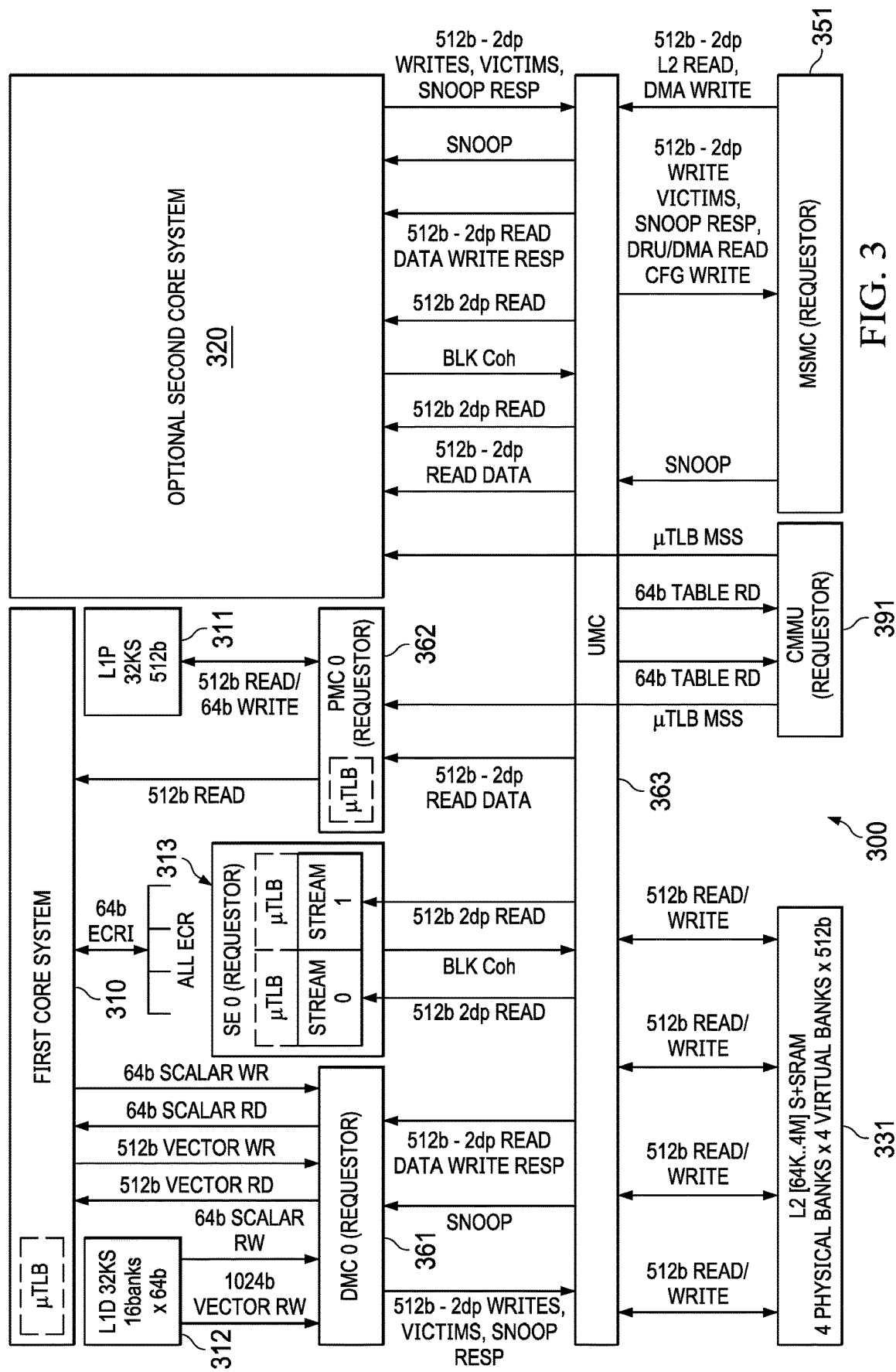
FIG. 3 shows an example one- or optionally two-core scalar and/or vector processor system 300 having a coherent and hierarchical memory architecture.

FIG. 3 shows an example one- or optionally two-core scalar and/or vector processor system 300 having a coherent and hierarchical memory architecture. System 300 is an example coherent shared memory system, such as system 200 or SoC 100. The system 300 includes at least one CPU core. For example, a first core can include first CPU 310, DMC 361, 32 KB L1D cache 312, PMC 362, 32 KB L1I cache 311, and dual stream buffer 313. An optional second core can include components similar to the first core. The CPU 310 (and second core 320, if present) are coupled via respective interfaces to the UMC 363, which is arranged to control the L2 cache tags and memory.

Generally described, system 300 includes various cache controllers such as program memory controller (PMC) 362 (e.g., for controlling data transfer to and from level 1 program 311 cache) and data memory controller (DMC) 361 (e.g., for controlling data transfer into and out of level 1 data cache 312). As shown in FIG. 1, the L2 cache can be shared between the two processing cores. System 300 also includes unified memory controller (UMC) 363 (e.g., for controlling data transfers between level 2 and level 3 caches). The UMC 363 is included by the level 2 cache, which is described hereinbelow with respect to FIG. 4, for example. The UMC 363 is coupled to the MMU (memory management unit) 391 and the MSMC 351. The DMC 361, the PMC 362, the SE 313, MSMC 351, and the MMU 391 are requestors, all of which can access memory stored in the L2 cache.

In an example, the system 300 is a pipelined caches and memory controller system for fixed- and/or floating-point DSPs (digital signal processors). The system 300 includes at least one such CPU core (where each CPU core includes respective private L1 caches, controllers, and stream buffers), and a shared L2 cache controller. The system 300 can provide bandwidth of up to 2048-bits of data per cycle, which is an 8-times bandwidth improvement over a previous-generation system. The L1D can sustain transferring 512-bits of data to the CPU every cycle, and the L2 cache can transfer 1024-bits of data to the dual stream buffer every cycle. The L1 and L2 controllers have the ability to queue up multiple transactions out to a next higher level of memory, and can reorder out-or-order data returns. The L1P 311 controller supports branch exit prediction from the CPU and can queue up multiple prefetch misses to the L2 cache included by UMC 363.

The system 300 includes full soft error correction code (ECC) on its data and TAG rams (e.g., described hereinbelow with respect to FIG. 4). The employed ECC scheme provides error correction for data transmitted over processor pipelines and interface registers, in addition to the error correction for memory-stored data. The system 300 supports full memory coherency in which, for example, the internal (e.g., included by the level 1 and level 2 caches) caches and memories are kept coherent with respect to each other and with respect to external caches and memories (such as the MSMC 351 for level 3 caching and such as external memory at a fourth and final level memory hierarchy). The UMC 363 maintains coherency between the multiple L1Ds and maintains coherency between the L1Ds and each of the higher, successive levels of the cache and memory. The UMC 363 can maintain coherency with the dual streaming engine by snooping (e.g., via a pipeline separate from a stream datapath) L1D cache lines in response to streaming engine reads.

The system 300 supports coherency throughout virtual memory schemes, and includes address translation, µTLBs (micro translation look-aside buffers), L2 page table walks, and L1P cache invalidates. The UMC 363 can support one or two stream buffers, each with two streams. The stream buffer data are kept coherent to the L1D cache, where each stream buffer has a pipelined, high bandwidth interface to L2 cache.

The system 300 includes example interfaces between various components of differing hierarchies in the system 300. With the possible exceptions of the CPU-to-DMC (CPR-DMC) and the CPU-to-PMC (CPR-PMC) interfaces, the inter-level interfaces and data paths can be architected in accordance with a pipelined, multiple transactions standard (e.g., VBUSM or MBA).

The example interfaces include the CPU-DMC, CPU-PMC, DMC-UMC, PMC-UMC, SE-UMC, UMC-MSMC, MMU-UMC, and PMC-MMU interfaces. The CPU-DMC includes a 512-bit vector read and a 512-bit vector write and a 64-bit scalar write. The CPU-PMC includes a 512-bit read. The DMC-UMC includes a 512-bit read and 512-bit write interfaces for executing cache transactions, snoop transactions, L1DSRAM DMA, and external MMR accesses (e.g., where each such interface can handle 2 data phase transactions). The PMC-UMC interface includes a 512-bit read (which supports 1 or 2 data phase reads). The SE-UMC interface includes 512-bit read (which supports 1 or 2 data phase reads). The UMC-MSMC UMC interface includes 512-bit read and 512-bit write (with overlapping Snoop and DMA transactions). MMU-UMC interface includes page table walks from L2. The PMC-MMU interface includes µTLB miss to MMU.

The L1P 311 includes a 32 KB L1P cache that is 4-way set associative having a 64-byte cache line size, where each line is virtually indexed and tagged (48-bit virtual address). The L1P 311 includes auto prefetching on L1P misses (where a prefetch miss from L2 can include a two data phase data return. The L1P 311 is coupled to (e.g., included by) and controlled by the PMC 362.

The PMC 362 supports prefetch and branch prediction with the capability to queue up to a variable number (e.g., up to 8) fetch packet requests to UMC (e.g., to enable deeper prefetch in program pipeline).

The PMC 362 includes error correction codes (ECC) with parity protection on data and tag RAMs (e.g., 1-bit error detection for tag and data RAMs). The Data RAM parity protection is supplied with 1 parity bit per every 32 bits). In tag RAMs, a parity error can force auto-invalidate and pre-fetch operations.

The PMC 362 supports global cache coherence operations. The PMC 362 can single-cycle cache invalidate with support for three modes (e.g., All Cache Lines, MMU Page Table Base 0, and MMU Page Table Base 1).

The PMC 362 provides virtual memory by virtual-to-physical addressing on misses and incorporates a µTLB to handle address translation and for code protection.

The PMC 362 provides emulation and debugging capability by including access codes that can be returned on reads to indicate the level of cache that the data was read from and bus error codes that can be returned to indicate pass/fail status of all emulation reads and writes. The PMC 362 provides extended control register access including L1P ECR registers accessible from the CPU through a non-pipelined interface. The extended control registers are not memory mapped, and instead can be mapped via a MOVC CPU instruction.

L1D Cache 312 is a direct mapped cache, and is mirrored in parallel with a 16 entry fully associative victim cache. The L1D Cache 312 includes a 32 KB memory configurable down to 8 KB cache. The L1D Cache 312 includes a dual datapath (e.g., for 64-bit scalar or 1-Kb vector operands). The L1D Cache 312 includes a 128-byte cache line size. The LID Cache 312 includes read allocate cache support for both write-back and write-through modes. The LID Cache 312 is physically indexed, physically tagged (44-bit physical address), supports speculative loads and hit under miss, has posted write miss support, and provides write merging on all outstanding write transactions inside LID. The LID Cache 312 supports a FENCE operation on outstanding transactions. The LID is auto-flushing and idle-flushing.

The LID Cache 312 includes LID SRAM for supporting accesses from CPU and DMA. The amount of available SRAM is determined by the total of L1D memory and L1D cache size.

The DMC 361 includes lookup table and histogram capability to support 16 parallel table lookup and histograms. The DMC 361 can initial the lookup table and dynamically configure the L1D SRAM into multiple regions/ways in response to a selected degree of parallelism.

The DMC 361 includes 64-bit and 512-bit CPU load/store bandwidth, 1024 bit LID Memory bandwidth. The DMC 361 provides support for 16 interfaces for 64-bit wide banks with up to 8 outstanding load misses to L2. Physical banks and virtual banks are described hereinbelow with respect to FIG. 5A and FIG. 5B.

The DMC 361 includes Error Detection and Correction (ECC). The DMC 361 includes ECC Detection and Correction on a 32-bit granularity. This includes full ECC on data and tag RAMs with 1-bit error correction and 2-bit error detection for both. The DMC 361 provides ECC syndromes on writes and victims out to L2. The DMC 361 receives ECC syndromes with read data from L2, and performs detection and correction before presenting the validated data to CPU. The DMC 361 provides full ECC on victim cache lines. The DMC 361 provides provide read-modify-write support to prevent parity corruption on partial line writes. The ECC L2-L1D interface delays correction for read-response data pipeline ECC protection.

The DMC 361 provides emulation and debug execution by returning access codes (e.g., DAS) on reads to indicate the level of cache that the data was read from. Bus error codes can be returned to indicate pass/fail status of emulation reads and writes. The contents of the cache tag RAMs are accessible via the ECR (extended control register).

The DMC 361 provides atomic operations on the Swap operation or the Compare and Swap operations to cacheable memory space and increment to cacheable memory space.

The DMC 361 provides coherence including fully MESI (modified-exclusive-shared-invalid) support in both main and victim caches. The DMC 361 provides support global cache coherence operations including snoops and cache maintenance operation support from L2, snoops for L2 SRAM, MSMC SRAM and External (DDR) addresses and full tag-RAM comparisons on snoop and cache maintenance operations.

In an example, the DMC 361 provides 48-bit wide virtual memory addressing for physical addressing of memory having physical addresses of 44-bits.

The DMC 361 supports extended control register access. L1D ECR registers are accessible from the CPU through a non-pipelined interface. These registers are not memory mapped, and instead are mapped to a MOVC CPU instruction.

The DMC supports L2 address aliasing (including VCOP Address Aliasing mode). The aliasing can be extended to multiple, separate buffers, such as the VCOP-IBUFAH, IBUFAL, IBUFBH, IBUFBL buffers. The L2 address aliasing includes out-of-range and ownership checking for all buffers to maintain privacy.

UMC 363 controls data flow into and out of L2 cache 331. L2 cache 331 is 8-Way Set Associative, supports cache sizes 64 KB to 1 MB. L2 cache 331 policy includes random least recently used (LRU) and/or random replacement. L2 cache 331 has a 128 byte cache line size. L2 cache 331 has a write-allocate policy and supports write-back and write-through modes. L2 cache 331 performs a cache invalidation on cache mode changes, which is configurable and can be disabled. L2 cache 331 is physically indexed, physically tagged (44-bit physical address) including 4 each of banked tag RAM's, which allow four independent split pipelines. L2 cache 331 supports 2 each of 64 byte streams from a streaming engine, the LID and LIP caches, and configuration and MDMA accesses on an unified interface to MSMC 351. L2 cache 331 caches MMU page tables.

An example L2 SRAM component of L2 cache 331 includes 4 each of 512-bit physical banks, with each physical bank having 4 virtual banks. Each bank (e.g., physical and/or virtual bank) has independent access control. L2 SRAM includes a security firewall on L2 SRAM accesses. L2 SRAM supports DMA accesses on a merged MSMC interface.

UMC 363 provides prefetch hardware and on-demand prefetch to External (DDR), MSMC SRAM and L2 SRAM.

The L2 cache provides error detection and correction (e.g., ECC) on a 256-bit granularity. Full ECC Support is provided for both tag and data RAMS with 1-bit error correction and 2-bit error detection for both. The ECC (see, for example ECC GEN RMW 471, described hereinbelow) includes ECC syndrome on writes and victims out to MSMC 351 and includes Read-Modify-Writes on DMA/DRU writes to keep parity valid and updated. The ECC is arranged to correct and/or generate of multiple parity bits for data being sent over datapaths/pipelines to the LIP 311 and SE 313. This includes an auto-scrub to prevent accumulation of 1-bit errors, and to refresh parity. The ECC clears and resets parity on system reset.

UMC 363 provide emulation and debugging by returning access codes on reads to indicate the level of cache that the data was read from. Bus error codes are returned to indicate pass/fail status of emulation reads and writes.

UMC 363 supports full coherence between the L1D 312, 2 Streams of the SE 313, L2 SRAM 331, MSMC 351 SRAM and external memory (DDR). This includes L1D to shared L2 coherence, which can be maintained in response to snoops for L2 SRAM, MSMC SRAM and External (DDR) addresses. The coherence is maintained via a MESI scheme and policies. UMC 363 includes user coherence commands from the SE 313 and includes support for Global Coherence operations.

UMC 363 supports Extended Control Register Accessing. L1D ECR registers are accessible from the CPU through a non-pipelined interface. The content of the ECR registers are accessible in response to a MOVC CPU instruction.

The UMC 363 supports L2 address aliasing (including VCOP Address Aliasing mode). The aliasing can be extended to multiple, separate buffers, such as the VCOP-IBUFAH, IBUFAL, IBUFBH, IBUFBL buffers. The L2 address aliasing includes out-of-range and ownership checking for all buffers to maintain privacy.

The MSMC 351 allows the processor modules 110 to dynamically share the internal and external memories for both program and data within a coherent memory hierarchy. The MSMC 351 includes internal RAM, which offers flexibility to programmers by allowing portions of the internal RAM to be configured as shared level 3 RAM (SL3). The shared level 3 RAM is cacheable in the local L2 caches. The MSMC can be coupled to on-chip shared memory.

An MFENCE (memory fence) instruction is provided that stalls the instruction execution pipeline of the CPU 310 until the completion of all the processor-triggered memory transactions, which can include: cache line fills; writes from L1D to L2 or from the processor module to MSMC 351 and/or other system endpoints; victim write backs; block or global coherence operations; cache mode changes; and outstanding XMC prefetch requests. The MFENCE instruction is useful as a simple mechanism for stalling programs until dispatched memory requests reach their endpoint. It also can provide ordering guarantees for writes arriving at a single endpoint via multiple paths, for example, where multiprocessor algorithms depend on ordering of data written to a specific address, and during manual coherence operations.

The system memory management unit (MMU) 391 invalidates μTLBs in response to processor context switches, for example to maintain privacy.

Figure 4:
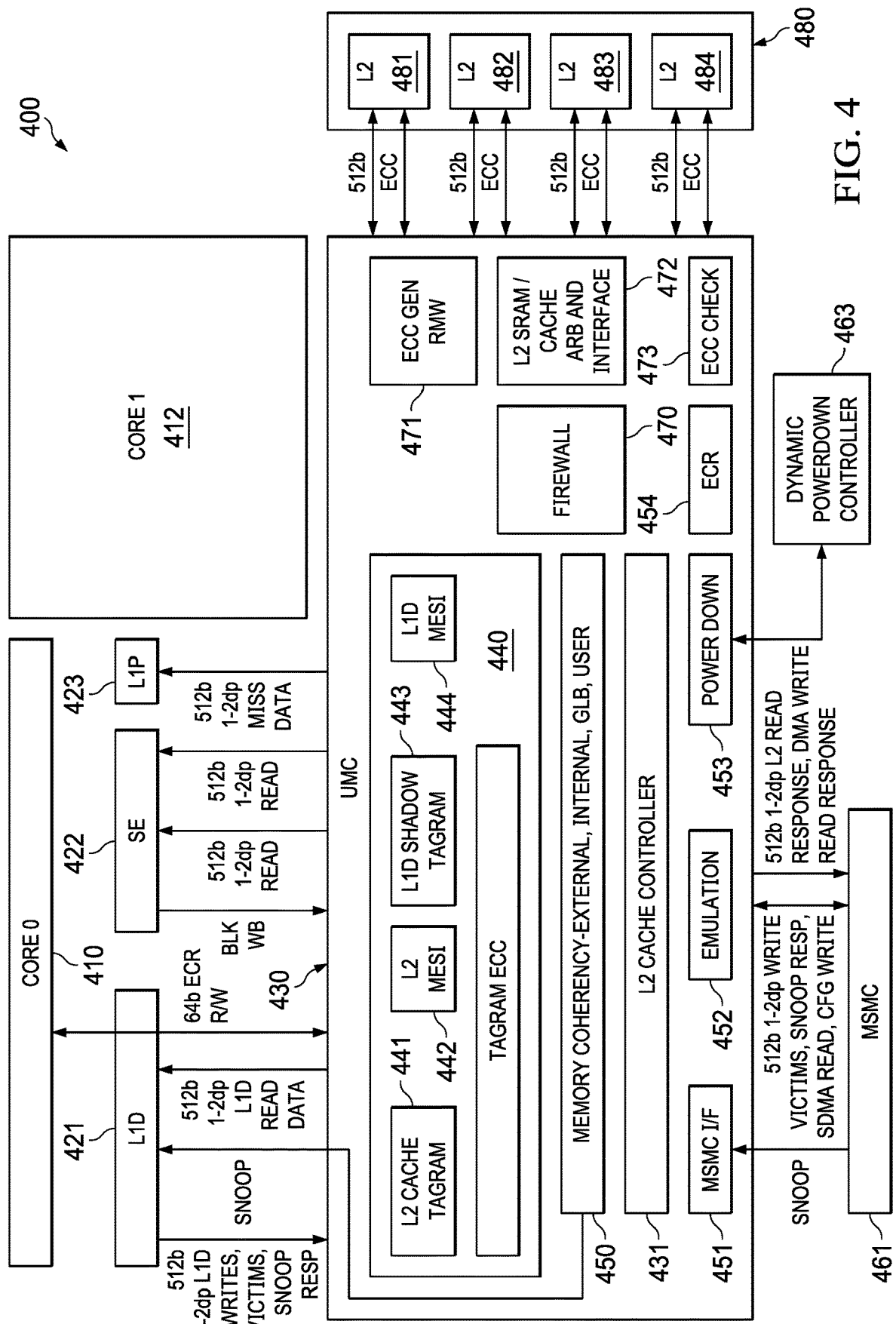
FIG. 4 shows an example unified memory controller of a second level of a coherent and hierarchical memory architecture.

FIG. 4 shows an example unified memory controller of a second level of a coherent and hierarchical memory architecture. System 400 is an example coherent shared memory system, such as system 300. The system 400 includes at least one CPU. For example, a first core (core 0) can include CPU 410, L1D 421, SE 422, L1P 423, and a MSMC 461, a dynamic powerdown controller 463, and a level 2 memory 480. An optional second core (core 1) can include components similar to the first core. The first core (and second core 412, if present) are coupled via respective interfaces to the UMC 430, which is arranged to control the L2 cache tags and memory.

The UMC 430 includes an L2 cache controller, a status memory 440 (which includes L2 cache tag RAM 441, L2 MESI 442, L1D shadow tag RAM 443, L1D MESI 444, and tag RAM ECC 445), memory coherency (external, internal, global, user) 450 controller, MSMC interface 451, emulation 452 controller, power down controller 453, extended control register (ECR) 454, firewall 470, ECC generator read-modify-write (ECC GEN RMW), L2 SRAM/cache arbitration and interface 472, and ECC checking 473.

Generally described (with reference to FIG. 3 and FIG. 4), system 400 includes six requestor ports (e.g., interfaces) coupled to the UMC 430: one PMC 362, one DMC 361, two SE ports (included in one streaming engine, SE 313), internal ECR 454 interface from the CPU (e.g., CPU 410), and the MSMC 461. The DMC 361 interface has separate 512-bit read and write paths. This interface can also be used for snooping from the L1D cache. Each read transaction can be either one or two data phases. The PMC 362 interface consists of a 512-bits read-only path (L1P fetch only). Each read transaction can be either one or two data phases. Two SE interfaces (of SE 313) are 512-bit read-only. Each read transaction can be either one or two data phases. The read transactions are also used as part of the user block coherence functionality. The MSMC 461 interface consists of separate 512-bit read and write paths. The separate 512-bit read and write paths interfaces are also used for snoop commands, read/write accesses to L2 SRAM, and read/write accessed to L1D SRAM. Each read transaction can be either one or two data phases. The internal ECR 454 interface from each CPU of system 400 is a 64-bit non-pipelined interface, and is used for configuration accesses to ECR 454 registers of the UMC 430.

The UMC to DMC interface includes: a 512-bit DMC read path; a 512-bit DMC write path; DMC to UMC signals (such as Read/Write/Victim Address, Address and Secure of cache line evicted to victim buffer, Address and Secure of cache line evicted from victim buffer, two tag update interfaces to indicate a clean line which was evicted from the victim buffer, byte enables, read/write indicator, MMU Page table attributes/privilege/security level indicators, snoop response, L1D cache-mode signals such as size, size change on, global coherence on, and global coherence type); and UMC to DMC signals (such as snoop signaling, response on reads and writes, and other such handshaking signals).

The UMC to PMC interface includes: a 512-bit PMC read path; a PMC to UMC fetch address; and other such handshaking signals.

The UMC to SE interface includes: a 512-bit SE read path; a SE to UMC fetch address; SE to UMC User Block Coherence indicators; and other such handshaking signals.

The MSMC to UMC interface is coupled to carry multiple types of transactions such as: Master DMA (MDMA, which can include cache allocates, victims, long distance writes, and non-cacheable reads, where such MDMA transactions can originate from the UMC); External Configuration (ECFG, which can include read/write accesses to memory mapped registers that can be physically located outside the CPU core, where such read/write access can originate from the UMC); DMA transactions (which can originate from the MSMC and are transactions that can transfer data, for example, between different CPU cores, between a CPU core and an external DDR), or between a CPU core and a non-DDR memory on the SOC, where the transaction can be created by the DMA controller, and can be directed towards either L2 SRAM or L1D SRAM); snoop transactions (which can originate from the MSMC, and can be generated in response to a transaction from another core, so that the another core can snoop data from a first CPU core); and Cache Warm (e.g., so that the MSMC can originate transactions that UMC can use to allocate a line from a 3L cache or an external memory to the UMC cache).

The UMC to MSMC interface includes: a 512-bit MSMC read path; a 512-bit MSMC write path; MSMC to UMC signals (such as Address, Byte enables, Read/write indicator, MMU page table attributes/privilege/security level indicators, snoop transactions, DMA transactions, and cache warm transactions); and UMC to MSMC signals (such as snoop response, address, byte enables, read/write indicator, and MMU page table attributes/privilege/security level indicators) and other such handshaking signals.

The UMC ECR Interface Memory Mapped Registers of previous generations have been replaced by Extended Control Registers (ECR) in the system 400 and are mapped to the MOVC CPU instruction. The UMC ECR path allows for 64-bit read/write access to the UMC's control registers. For configuration reads, the UMC is arranged to sample the contents of the register and hold it for the duration of the access. The UMC ECR interface includes: a 64-bit ECR read path; a 64-bit ECR write path; Address; Privilege/security level indicators; Index, which can be used for cache tag viewing; and other such handshaking signals.

An example UMC to MMU Interface includes: a 64-bit read path; an address; and other such handshaking signals.

Some example UMC to L2 Interfaces include: either 2 or 4 virtual banks; 4 physical banks of L2 memory, where each bank includes an addressable unit of data that is 512-bits wide; a 512-bit read datapath; a 512-bit write datapath; address; byte-enables; memory enable indicator; read/write indicators; virtual bank select; and other such handshaking signals.

The UMC 430 includes a level 2 memory 480 (e.g., SRAM). The L2 memory 480 can include any suitable number of banks and 4 banks 481, 482, 483, and 484 are illustrated, where each such bank is coupled by respective sets of a 512b read/write data path and an ECC data path. The 4 banks can be organized as having 4 virtual banks each, or as having 2 virtual banks each, as described hereinbelow with reference to FIG. 5A and FIG. 5B

Figure 5A:
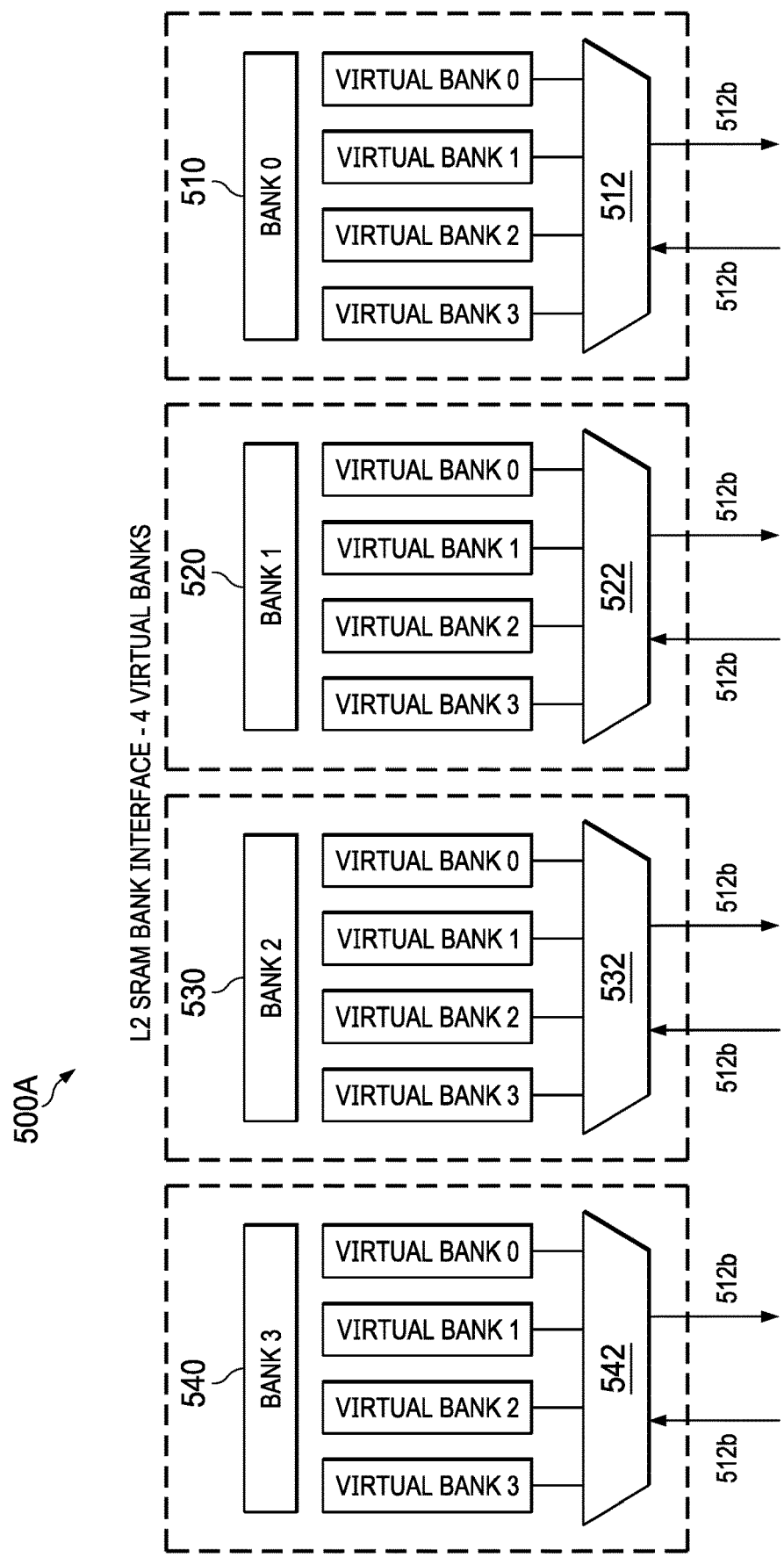
FIG. 5A shows an example level 2 memory bank interface of the system of FIG. 4 having 4 virtual banks per physical bank.

FIG. 5A shows an example level 2 memory bank interface of the system of FIG. 4 having 4 virtual banks per physical bank. For example, the interface 500A includes physical bank 510 (e.g., bank 0), physical bank 520 (e.g., bank 1), physical bank 530 (e.g., bank 2), and physical bank 540 (e.g., bank4). Each of the physical banks 510, 520, 530, and 540 respectively includes 4 virtual banks (virtual bank 0, virtual bank1, virtual bank 2, and virtual bank 3). Each of the virtual banks of each physical bank includes a respective multiplexor/demultiplexor, so that each respective virtual bank of a given (e.g., addressed) physical bank can be written to or read from in a virtual bank memory access. Each virtual bank in a given physical bank can be successively accessed using (e.g., with overlapping or separate) virtual bank memory accesses.

Figure 5B:
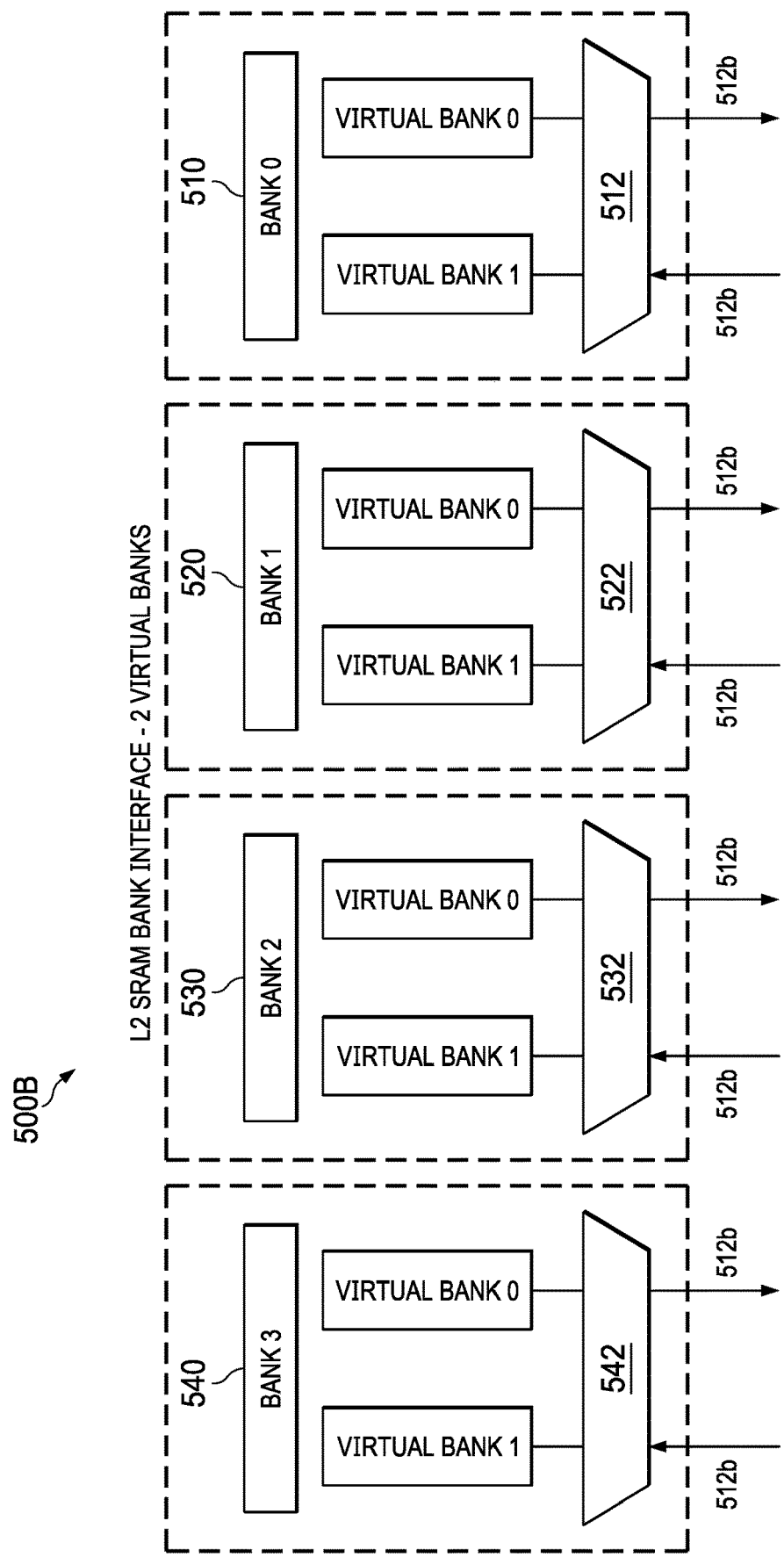
FIG. 5B shows an example level 2 memory bank interface of the system of FIG. 4 having 2 virtual banks per physical bank.

FIG. 5B shows an example level 2 memory bank interface of the system of FIG. 4 having 2 virtual banks per physical bank. For example, the interface 500B includes physical bank 510 (e.g., bank 0), physical bank 520 (e.g., bank 1), physical bank 530 (e.g., bank 2), and physical bank 540 (e.g., bank4). Each of the physical banks 510, 520, 530, and 540 respectively includes 2 virtual banks (virtual bank 0 and virtual bank 1). Each of the virtual banks of each physical bank includes a respective multiplexor/demultiplexor, so that each respective virtual bank of a given (e.g., addressed) physical bank can be written to or read from in a virtual bank memory access. Each virtual bank in a given physical bank can be successively (e.g., with overlapping or separate) virtual bank memory accesses.

With reference to FIG. 4 again, the UMC 430 includes four 512-bit wide memory ports, which can be referred to as UMC Memory Access Port (UMAP) ports. Each L2 SRAM interface (e.g., an interface of a requestor to the L2 cache) can support one new access per UMC cycle when the memory banks arranged in the SRAM can respond within each UMC cycle. Accesses to the memory banks can be pipelined over multiple UMC cycles, which can allow higher-latency memories to be used. Each of the virtual banks can include differing latencies because each interface verifies the availability of each virtual port, rather than the availability of the physical bank as a whole.

The UMC L2 SRAM protocol accommodates a memory that is connected directly to UMC 430. The UMC 430 presents address and read/write indications on the UMAP boundary, and waits for a period of time (e.g., latency) during which the L2 SRAM is "expected" to respond. The UMC 430 is able to control the four banks independently Accesses to these virtual banks are issued serially. Consecutive requests to the same virtual bank result in a "bank conflict" if the attached memory has greater than 1 cycle pipeline latency. The second request is delayed until the first request completes. Consecutive requests to different virtual banks can proceed without delay (e.g., when the latency of a later-accessed memory is not greater than twice the 1 cycle pipelining latency).

The UMC 430 can read the returned data after the programmed access latency (e.g., in the absence of a memory error). Two different types of latencies are supported—pipeline latency, and access latency. Pipeline latency is the number of cycles that UMC has to wait before it can access the same virtual bank again. Access latency is the number of cycles that it takes for the memory to present data to UMC, after the read command has been presented. In an example system, latencies from 1 to 6 for both pipeline and access latencies are supported by the UMC 430.

Variations in latencies between differing types of SRAM can be compensated for by inserting wait states into a memory access, where the number of wait states is selected in response to the latency of the memory being accessed. One- and 2-cycle access latencies can be referred to as "0 wait-state" and "1 wait-state," respectively.

Security is the term generally applied to the protection of data in memory. The enforcement of security includes: assigning permissions to particular masters, designating memory address ranges with certain allowed actions for certain permissions, and determining whether each read and write transaction to each memory address includes sufficient privilege to access a particular address and to block accesses to the particular address to each transaction having an insufficient privilege.

Permission information includes permission possibilities construed over various axes. For example, the permission possibilities can be construed over the axes of Privilege, Hypervisor, and Secure (e.g., security) level. Along the Privilege axis, the permission possibilities include the possibilities of User or Supervisor. Along the Hypervisor (if applicable) axis, the permission possibilities include the possibilities of Root or Guest. Along the Security level axis, the permission possibilities include the possibilities of Secure or Non-secure. The permission possibilities are enforced across the three levels of caches.

The example DSP architecture includes at least two security states, each state having respective associated memory attributes for controlling physical and/or logical security components. The secure/non-secure state is an attribute that accompanies (or is otherwise associated with) the transaction presented by the CPU to the cache controllers. When the CPU is in a secure state (e.g., which can be indicated by a csecure attribute indicated on each of the transactions generated by the CPU), the cache controller of each of the cache levels allow the CPU to access secure and non-secure memory locations. When the CPU is in a non-secure state (e.g., which can be indicated by the csecure attribute indicated on each of the transactions generated by the CPU), the cache controller of each of the cache levels allow the CPU to access non-secure memory locations but prevents the CPU from accessing secure memory locations. The csecure attribute can be a "secure code" (e.g., where the secure code includes at least one bit of a secure status field and/or digital word status for indicating a security level of a process executing on the CPU. The secure code can be the "secure bit" as described herein.

In an example, the L2 firewall is used to provide security with respect to requestor-generated transactions that access the L2 SRAM and with respect to the L2-generated memory transactions that access higher levels of memory. The L2 firewall cooperates with the L3 firewall, so that the permission possibilities are accessible for controlling transactions that occur between the L2 and L3 caches. A secure firewall component is present at two interfaces: the UMC-MSMC Interface (e.g., which protect transactions initiated by the example CPU that go to or towards external memory), and the UMC-L2RSAM Interface (e.g., to protect accesses that go to or towards the L2 SRAM space).

Generally, a firewall can be configured in one of two modes: a Whitelist Mode (e.g., wherein designations are listed for indicating which masters/permissions are allowed to access predetermined address regions), and a Blacklist Mode (e.g., wherein designations are listed for indicating which masters/permissions are blocked from accessing predetermined address regions). In an example, the predetermined address regions can be predetermined before a time in which the firewall blocks or allows an access to an address in a predetermined address region.

To protect a selected level of cache memory controlled by a firewall (for example), the permission information (e.g., a protection policy for granting access permission to a particular block of addresses) can be stored in the selected level of cache, so that selected regions of memory can be specifically protected by a listing of granted or denied access for respective regions to be protected. For blacklisted areas, the firewall is arranged to block accesses to any cacheable memory location (e.g., any memory location having contents that can be stored in a cache). In an example, programming the firewall to block access to a cacheable memory location by a process for which access is not explicitly whitelisted can help prevent read-only memory from being cached, and then later locally updated in the cache due to a cache hit by a process.

Address areas for which no protection is specified exist between the address areas listed in the whitelist or the blacklist of the firewall. Such areas (e.g., "gray-listed areas") can result when not every possible memory location is assigned a selected protection policy. Not associating a selected protection policy for every possible memory location can be a trade-off design choice due to the finite nature of firewall configuration resources (such as limited memory or address processing requirements).

Access to a cache protected by a firewall can be enhanced (e.g., beyond the protection by a conventional firewall without additional complexity that would otherwise entail higher complexity circuits and layout space) in certain cache operations that impact data stored in the gray-listed areas (e.g., areas disjoint to the set of the union of the blacklisted and whitelisted areas listed in the firewall). In an example, the security level of the process that generated the data stored in a particular cache line can be stored in the tag memory associated with the particular cache line (including address tag, MESI status, and the herein-described status bit), protects the data stored in a gray-listed area without, for example, increasing the complexity of the firewall (e.g., in order to narrow the scope of the gray-listed areas).

For an access request by a requestor that is allowed (e.g., not blocked) by the firewall to access a selected cache line of a selected level cache, the selected cache line can be selectively snooped (e.g., read out from the L1 cache, but kept in the line present in the L1 cache), or snoop-invalidated (e.g., read out from the L1 cache, and removed from the L1 cache), or invalidated (e.g., removed from the cache) in response to a security context of access request and in response to a stored secure code that is associated with the selected cache line, where the stored secure code indicates a security context of a process at the time the process generated the information stored in the selected cache line. For example, the selectively invalidating or evicting a selected cache line can be in response to a comparison of the security context of the access request against the security context indicated by the secure code. For example, the selectively invalidating or evicting a selected cache line can be in response to a comparison of the security context of the access request against the security context indicated by the secure code. For example, the selectively invalidating or evicting a selected cache line can be determined in response to the security context of the access request and the security context indicated by the secure code are different.

As described hereinbelow, selectively invalidating or evicting the selected cache line in response to a security context of access request and in response to a stored secure code that indicates a security context of the selected cache line can reduce the level of complexity of the firewall (e.g., to achieve a similar level of performance), can reduce the length of the time otherwise taken to flush the L1D cache (which is performed to prohibit malware from accessing cached contents, for example), and can increase the overall performance of the CPU/memory system that includes the cache of the selected cache line Evicting a reduced subset of cache lines reduces the number of CPU stalls that would otherwise (e.g., without the security matching of the memory request security context against the security context of the cache line addressed by the memory request) occur during the cache eviction process. By not evicting data having the same security context, which reduces or eliminates the latency encountered to promulgate the evicted cache information to a memory endpoint (e.g., external memory) and the latency otherwise encountered when reloading the evicted line.

In writeback caches, a value in a memory location stored in a line of cache can be modified (dirty, e.g., modified by a CPU) with respect to main memory. When the memory allocated for the modified cache line is determined to be needed for other memory, the modified cache line can be evicted. When the cache line that includes the modified value is evicted from the cache, the evicted cache line (which includes dirty memory) is progressively sent to the next higher level of reduces the length of the time otherwise taken to flush the L1D cache, which increases the overall performance of the memory system that includes the L1D cache by reducing the number of CPU stalls that occur during the cache eviction the memory hierarchy. (The evicted cache line can also be stored in a victim cache at the same level of cache hierarchy.) In response to progressively sending the dirty cache line to higher levels of cache, the corresponding portion of main memory is ultimately updated with the modified information stored in the evicted cache line. When the corresponding portion of main memory is updated with the dirty cache line, all of memory includes the modified data, so that the memory system is (for example) once again coherent and so that the modified data can be considered to be no longer dirty.

The UMC 430 (as described hereinabove with respect to FIG. 4) is coupled to control the level 2 memory 480 in response to the firewall 470. The firewall 470 includes a dedicated white-list firewall, which can be programmed to allow/disallow access for selected L2 SRAM address regions. Each of the selected L2 SRAM address regions can be assigned a respective cache policy. The assigned respective cache policy can be a policy such as a selected permission level for each kind of access (e.g., such as memory read accesses or write accesses). Table 3 shows example caching policy assignments.

TABLE 3

| Transaction Type | Transaction Attributes (D = debug, C = cacheable, R = read, W = write) | | | Firewall Region Permissions | | | | Firewall Cache mode | Firewall Result |
| --- | --- | --- | --- | --- | --- | --- | --- | --- | --- |
| | D | C | R/W | D | C | R | W | CM | |
| Normal | 0 | 0 | W | — | — | — | 0 | — | Fail - No write permission |
| Write | 0 | 0 | W | — | — | — | 1 | — | Pass - Has write permission |
| Normal | 0 | 0 | R | — | — | 0 | — | — | Fail - No read permission |
| Read | 0 | 0 | R | — | — | 1 | — | — | Pass - Has read permission |
| Cacheable | 0 | 1 | W | — | 0 | — | — | 0 | Fail - No cacheable permission (CM = 0) |
| Write | 0 | 1 | W | — | 1 | — | — | 0 | Pass - Has cacheable permission (CM = 0, R/W ignored) |
| | 0 | 1 | W | — | — | — | 0 | 1 | Fail - No write permission (CM = 1) |
| | 0 | 1 | W | — | — | — | 1 | 1 | Pass - Has write permission (CM = 1) |
| Cacheable | 0 | 1 | R | — | 0 | — | — | 0 | Fail - No cacheable permission (CM = 0) |
| Read | 0 | 1 | R | — | 1 | — | — | 0 | Pass - Has cacheable permission (CM = 0, R/W ignored) |
| | 0 | 1 | R | — | — | 0 | — | 1 | Fail - No read permission (CM = 1) |
| | 0 | 1 | R | — | — | 1 | — | 1 | Pass - Has read permission (CM = 1) |
| Debug | 1 | 0 | W | 0 | — | — | — | — | Fail - No debug permission |
| Write | 1 | 0 | W | 1 | — | — | — | — | Pass - Has debug permission (R/W ignored) |
| Debug | 1 | 0 | R | 0 | — | — | — | — | Fail - No debug permission |
| Read | 1 | 0 | R | 1 | — | — | — | — | Pass - Has debug permission (R/W ignored) |
| Debug | 1 | 1 | W | 0 | — | — | — | — | Fail - No debug permission |
| Cacheable | 1 | 1 | W | 1 | 0 | — | — | 0 | Fail - No cacheable permission (CM = 0) |
| Write | 1 | 1 | W | 1 | 1 | — | — | 0 | Pass - Has debug and cacheable permissions (CM = 0, R/W ignored) |
| | 1 | 1 | W | 1 | — | — | — | 1 | Pass - Has debug permission and cacheable ignored (CM = 1, debug causes R/W ignored) |
| Debug | 1 | 1 | R | 0 | — | — | — | — | Fail - No debug permission |
| Cacheable | 1 | 1 | R | 1 | 0 | — | — | 0 | Fail - No cacheable permission (CM = 0) |
| Read | 1 | 1 | R | 1 | 1 | — | — | 0 | Pass - Has debug and cacheable permissions (CM = 0, R/W ignored) |
| | 1 | 1 | R | 1 | — | — | — | 1 | Pass - Has debug permission and cacheable ignored (CM = 1, debug causes R/W ignored) |

As described with respect to FIG. 2, for example, an example L1D heterogeneous cache implementation can cache L2 SRAM address(es) for each cached line in the L1 (data) cache 223 and (L1D) victim cache 223. The management of the L1D main and victim caches and the L2 shadow copies is performed in response to a dedicated protocol/interface coupled between L1D and L2 controllers, which allows passing allocation and relocation information from the L1 to the L2 controllers. The L2 controller can respond to transactions and information from the L1 and can also create and enforce snoop transactions for maintaining I/O (DMA) coherence from non-caching requestors within the same shareability domain. The snoop transactions can cause the L2 controller to initiate changes to the shadow caches of the L2 cache and to the main/victim caches of the L1D cache.

The level 1 (e.g., L1D) controller 222 can include program-initiated cache maintenance operations (CMO) that can be selected by a programmer to manage the occupancy of the caches in the L1D and L2 controllers at a granularity of an individual cache line.

In an example described herein with reference to FIG. 4, CMO transactions can issue from a streaming engine to the L2 controller (e.g., UMC 430) via a direction transaction on a VBUSM.C protocol interface. The VBUSM.0 protocol interface is arranged to intercouple the SE 422 and the UMC 430. Table 4 shows an example VBUSM.0 protocol interface.

TABLE 4

| Signal mnemonic | Description | Actual Signal |
| --- | --- | --- |
| caddress | Allocate address | caddress |
| csecure | Allocate security level | csecure |
| cvictim__address | Address of line moving out of victim cache | csband[96:53] |
| cvictim__secure | Secure bit for line moving out of victim cache | csband[52] |
| cvictim__mesi | MESI state for line moving out of victim cache | csband[51:50] |
| cvictim__valid | Valid bit for all cvictim* signals | csband[49] |
| cmain__address | Address of line moved from main cache to victim cache | csband[48:5] |
| cmain__secure | Secure bit for line moving from main cache to victim cache | csband[4] |
| cmain__mesi | MESI state for line moving from main cache to victim cache | csband[3:2] |
| cmain__valid | Valid bit for all cmain* signals | csband[1] |

TABLE 4-continued

| Signal mnemonic | Description | Actual Signal |
|---|---|---|
| calloc | Bit indicating whether the caddress line will be allocated into main cache | csband[0] |

The VBUS.C protocol includes an example csband signal. The csband signal is a packed bus (e.g., 97 bits wide) that concatenates several sub-signals, as shown in Table 4. The csband signals are asserted to maintain coherency during certain changes in cache state (e.g., where such changes can occur in response to cache activities such as allocation of cache lines and such as updating the shadow information in the L2 controller.

At certain times, the software-initiated CMO can require evicting/invalidating a block of addresses (or a single address) for a specific security level (e.g. Secure only vs. Non-secure only). A "secure code" (e.g., "secure bit") is described herein that can be used to control the L2 cache to maintain a fine-grained control of the by evicting/invalidating of a reduced-size (e.g., minimum) subset of L1D cache lines required by the CMO request. Such need for evicting/invalidating lines of cache from the L1D can occur in response to a change of a level of a privileged mode of the CPU (e.g., from secure-to-nonsecure or from nonsecure-to-secure). Table 5 shows an example tag line of L1D cache that includes a secure bit (csecure in the bit 49 position) for each cache line in the L1D cache.

TABLE 5

| TAG NAME | 63 52 | 51 | 50 | 49 | 48 13 | 12 0 |
|---|---|---|---|---|---|---|
| L1PCTAG | Reserved | VALID | TABLE BASE | CSECURE | TAG | Reserved |

Table 6 shows field descriptions of an example tag line of L1D cache that includes a secure bit (csecure) for each cache line in the L1D cache.

TABLE 6

| Bit | Field | Description |
|---|---|---|
| 12-0 | Reserved | Reads return 0 |
| 48-13 | TAG | Tag for cached line |
| 49 | CSECURE | Secure bit for cached line |
| 50 | TABLE BASE | Privilege bits for cached line |
| 51 | VALID | Line is present in the cache |
| 63-52 | Reserved | Reads return 0 |

Selected portions of the cache (e.g., subset of L1D cache lines) to be evicted or invalidated are determined in response to determining the status of the respective secure code for each cache line. Selecting a subset of the cache to be evicted (for example, rather than evicting all lines of the cache), reduces the length of the time otherwise taken to flush the L1D cache, which increases the overall performance of the memory system that includes the L1D cache by reducing the number of CPU stalls that occur during the cache eviction. Table 6 shows a tag line of a L1D cache, which includes a secure code bit for determining a secure status respective line.

The calloc signal is asserted to initiate read commands issued from L1D for reading an L2 cache line. The assertion of calloc (e.g. calloc==1) indicates that the given cache line (caddress+csecure) is being allocated by the L1D main cache. The csband information is used to update L1D shadow information in the L2 controller when calloc is asserted (e.g., calloc==1). When calloc is not asserted (e.g., calloc==0), the valid bits (cmain_valid and cvictim_valid) of the addressed cache line are set to 0, so that (for example) the L1D cache lines are not changed when the calloc signal is not asserted.

Generally, the same cache line (e.g., where a cache line is uniquely identified by an address and the state of the secure code) cannot be read by two requestors at the same time (e.g. while being transferred from main to victim cache, and while being transferred out of the victim cache). To help avoid this conflict, the values of the cvictim_address and the cvictim_secure (the secure bit for the L1D victim cache line) signals can be prohibited from exactly matching the respective values of the cmain_address and cmain_secure signals during the time in which the calloc signal is asserted (calloc==1) and the valid bits for the addressed cache line are set (e.g., when cmain_valid==1 and cvictim_valid==1).

The snoop and DMA transactions initiated by the L3 controller operate similarly to the CMO transactions issued by the streaming engine. For example, such snoop and DMA transactions include a secure code for indicating the security level of the process of the originating request.

The coherent read transactions issued from the MMU or the streaming engine also operate similarly to the CMO transactions issued by the streaming engine. For example, the coherent read transactions include a secure code for indicating the security level of the coherent read requests.

In various examples, the L2 controller (e.g., L2 cache controller 431) is arranged to receive from a requestor an access request that indicates a selected cache line. The L2 controller is arranged to compare a secure code of the received access request against a stored secure code that is associated with the secure context of a previous access request that wrote the present information into the selected cache line. In response to the comparison, the selected cache line can be selectively invalidated or evicted, so that a subset (e.g., a set smaller than the entire set) of selected cache lines is invalidated or evicted in response to a change in the security level (e.g., as indicated by the secure code) of the requestor.

The L2 controller is coupled to a level two data cache, which is stored L2SRAM physical structure. The L2SRAM is a monolithic endpoint RAM, and is arranged to store none, one, or two cache lines for an address indicated by an access request from a requestor. In various examples, a number of cache lines for a single cacheable address that can be stored in the L2SRAM is equal to the number of security levels that can be indicated by the secure code of the received access request. In an example, the secure code is a bit (e.g., the "secure bit"), so that data for storing in a given cacheable address can be stored in a first cache line associated with the first possible value of the secure code (e.g., when the secure bit is 0), and so that data for storing in the given cacheable address can be stored in a second cache line associated with the second possible value of the secure core (e.g., when the secure bit is 1).

Coherency is maintained by including a field (e.g., a bit field) for the secure code (e.g., a secure bit) in each of the L1D tags, L2 tags, and L2 shadow tags. When an access request results in information being written into a cache line for any of the L1D tags, L2 tags, and L2 shadow tags, the secure code (e.g., secure bit) of (e.g., included by) the access request is further propagated to the other caches that include (or are to include) the information of the cache line indicated by the access request.

The access request includes a secure code for indicating a security level of the security context of the requestor initiating the access code. As described hereinbelow, the secure code (e.g., secure bit) can be included in an L1D tag, a CMO or Snoop transaction, an MMU or SE read transaction, and a DMA read/write transaction. An L2 snoop transaction to L1D includes the secure code of the originating CMO/Snoop/Read/DMA transaction request.

When a transaction is processed by the L2 controller that requires a lookup in the shadow copy of the L1D main or victim cache tags, the L2 controller evaluates the secure code of the cache line addressed by the transaction being processed to determine a "hit" or a "miss" (e.g., by the access to the L1D cache line). For example, a hit is determined for the incoming transaction: 1) in response to detecting a match between the stored secure code of the addressed cache line in the shadow tags and the secure code of the incoming transaction; AND 2) in response to detecting a match between an address of a cached line in the shadow tags and the cache line address of the incoming transaction. In the example, a miss is determined for the incoming transaction: 1) in response to not detecting a match between the stored secure code of the addressed cache line in the shadow tags and the secure code of the incoming transaction; OR 2) in response to not detecting a match between an address of a cached line in the shadow tags and the cache line address of the incoming transaction.

To help ensure the L1D accurately performs its own hit/miss detection of subsequent snoop transactions processed by the L1D, the secure code associated with the most recent cache line hit by the L2 controller can be transferred to the L1D controller. The secure code associated with the most recently cache line hit by the L2 controller can be transferred to the L1D controller via a snoop transaction initiated by the L2 controller (via the VBUSM.C bus interface protocol signaling) in response to the most recent cache line hit (e.g., that includes the hit/miss detection in response to the state of the secure code).

In contrast, conventional solutions lack a secure code in the cache tags that indicates a security level of the requestor context by which the cache line was tagged. Such a lack of retaining the security level of the requestor context by which the cache line was tagged can result in gross security control faults (e.g., because the distinction between secure and non-secure contexts security level of the requestor context by which the cache line was tagged can potentially allow an access request to be processed at a security level different from the security level of the requestor context by which the cache line was tagged.

The distinction between secure and non-secure contexts in the cache tags enables fine-grained cache eviction/invalidation of cache lines stored under a first context, for example, without impacting the caching performance of cache lines stored under a context different from the first context. In an example where a non-secure cache line is invalidated via a CMO operation, the secure line can remain in the cache, which results in an improved caching performance of the cache line stored in the secure software context. For example, this improvement can occur in cases where both the cache line stored in the non-secure software context and the cache line stored in the secure software context share the same tagged address in the same cache.

The efficiency of L2 controller to accurately perform coherent snoop operations to the L1D can be improved by performing the coherent snoop operations to the L1D for the subset of cases in which both the cached addresses and the security levels for the addressed cache line and the access request are the same. The selection-of which coherent snoop operations to the L1D are to be initiated-can be determined in response to evaluating the security level of the software context indicated by the secure code (e.g., the state of the secure bit) of the transaction, where the state of secure bit is stored in the cache tags in L1D (main or victim) cache and is also stored/maintained in the shadow copy of the L1D/L2 cache tags in the L2 cache.

Some comparable DSP SoCs include a single pipe (e.g., data pipeline) over which both accesses by a single CPU (e.g., where the accesses can include bus traffic resulting from load, store, and fetch instructions), DMA accesses, and local L2 accesses are transmitted, sequentially, across the single pipe. Such DSP system architectures did not support efficient accessing of multiple parallel banks due to the single pipeline over which L2 accesses were carried.

In some such examples, the L2 cache subsystem was not shared with other sources such as an MMU, or any other data streaming requestor, due to bandwidth constraints of the single pipe coupled between the DSP and the L2 cache subsystem. Moreover, functions such as IO coherence and safety are constrained due to such bandwidth constraints. The problem of limited bandwidth over the single pipe is further aggravated by the sequential nature of data processing by which data throughput is limited by processing latencies that can lengthen the time, for example, that DSP accesses block other requestors from accessing the single pipeline.

As described herein, a hierarchical, coherent memory system includes a midlevel (e.g., L2) memory and cache controller. In an example, an L2 memory and L2 controller is arranged to increase the bandwidth of a requestor-to-L2-cache pipeline while increasing the variety of heterogeneous requestors of the L2 cache. In an example, the datapath from the L2 cache and through a portion of the controller is multi-banked such that each requestor can effectively reach a full throughput (e.g., a full throughput of the requestor) to access each bank (e.g., via a dynamically assigned parallel portion of the L2 pipeline to a requested bank of the L2 cache).

The requestors (and respective cache transactions) can include an L1P (fetch), L1D (load/store), a MSMC (DMA to L2 or L1DSRAM, snoop, and CacheWarm), a MMU (page translation), a streaming engine (Streaming data on multi ports, cache coherency/maintenance operations). The destination endpoints of the requestor cache transactions can include an L2 SRAM, an L1D SRAM, an L2 cache, a MSMC SRAM, an L3 cache, external DDR, and other circuits (e.g., circuits that are external to the DSP and the support structures that are closely coupled to the DSP). The L2 controller is arranged to maintain coherency between the caches at each level of the hierarchy of the memory system, so that the caches of the hierarchical memory system maintain full coherency. IO coherency to L2 SRAM can also be maintained by the L2 controller. The L2 controller can include ECC for protecting data stored or transmitted through FIFOs and pipeline structures throughout the L2 controller-to-L2 cache memory datapaths.

The L2 controller is arranged to dynamically arbitrate between multiple requestors and to allocate a priority of accesses across multiple banks, so that each requestor is able to achieve a full throughput (e.g., from the viewpoint of the requestor). The L2 controller is arranged to select a set of optimizations in response to the type of requestor and requested cache transaction, so that an overall better system performance is achieved as a result of the selective allocation in parallel of banks and respective pipes. The allocation of parallel resources (such as banks and respective pipes) can be determined in response to the type of requestor and/or type of request, which allows the allocated resources (e.g., banks and pipes) to be efficiently shared by the multiple requestor in parallel (e.g., in an overlapping manner). The parallelism achieves a high level of data transfer rates and capacity, so that processor/requestor stalls (that would otherwise occur) are reduced and the available pipeline resources can be selectively allocated to service requestor cache operations.

The structures and techniques described herein selectively control and maintain a very high level of parallel data traffic in an example DSP system. The example system can include an arbiter for selecting and assigning datapath resources in response to the capabilities and priorities of each individual requestor. The structures and techniques described herein maintain data coherency throughout schemes for multiple banking (e.g., including banked pipes), dynamic Arbitration, optimized banking, and pipelining.

Memory and a cache controller are provided. To arrange parallelism of data transfers and achieve high levels of data throughput, an L2 cache controller can include banked cache memory, where each such bank is controlled in response to a control and datapath structure pipeline. Each such structure can have independent and dedicated access to its memories by a requestor. The pipeline can include sections for either blocking or not blocking transactions generated by one or more requestors. The non-blocking section(s) of the pipeline help ensure that transactions (e.g., high-priority transactions) that can potentially cause stalls in the system when not processed, are allowed to bypass other transactions. The blocking section(s) of the pipeline are used to store stalled transactions and to arbitrate between (e.g., selectively block transactions from) different requestors and transactions.

In various examples, the cache related memories (e.g., tag RAM, snoop tag RAM, MESI RAM) are banked in parallel in an arrangement that is similar to an arrangement of the L2 memory, which includes parallel banking structures.

FIG. 6 is a flow diagram of an example banked, selectively blocking cache controller pipeline having reservation-based arbitration and scheduling of cache transactions. The pipeline 600 is an example pipeline. The pipeline 600 is individually coupled to instances of various kinds of requestors including PMC 601 (such as PMC 362), DMC 602 (such as DMC 361), SE 603 (such as SE 313), MSMC 604 (such as MSMC 351), and CMMU 605 (such as MMU 391).

The overall UMC pipeline arbitration control can be arranged in six sections: a) a blocking Resource Allocation Unit (RAU) with extended local arbitration (ELA), which is coupled to a respective requestor; b) a RAU STAGE 1 (a blocking level-1 arbitration unit), which is coupled to a respective bank (e.g., banked pipe); c) a RAU STAGE 2 (a non-blocking Level-2 Arbitration Unit), which is coupled to a respective bank (e.g., banked pipe); d) a group of concatenated, non-blocking P0-P3 pipeline stages, which is coupled to a respective bank; e) a blocking P4 Stage, which includes the exit FIFOs of a banked pipeline; and f) a cache miss and snoop arbitration and send section (which includes arbiters 691 and 692).

Each of the requestors (e.g., PMC 601, DMC 602, SE 603, MSMC 604, and CMMU 605) is coupled to the pipeline 600 and can issue at least one cache access operation (transaction) for accessing the L2 RAM data memory 672. Each of the transactions are received and buffered in a respective arbitrating FIFO 610 (e.g., so that any or all of the requests in a particular FIFO can be prioritized based the particular FIFO that receives transactions of the particular kind of requestor coupled to the FIFO). In the example, each FIFO 610 is coupled to a respective RAU unit.

The first section of the RAU ELA includes RAU 621, RAU 622, RAU 623A, RAU 623B, RAU 624, and RAU 625. The RAU 621 is coupled to receive fetch transactions from the PMC 601. The RAU 622 is coupled to receive in parallel the read/write, victim, snoop/read response, and snoop response transactions from the DMC 602. The RAU 623A is coupled to receive read transactions from the SE 603. The RAU 623B is coupled to receive read transactions from the SE 603. The RAU 624 is coupled to receive in parallel block read/write, non-blocking write, snoop, and read response transactions from the MSMC 604. The RAU 625 is coupled to receive read transactions from the CMMU 605.

Each RAU ELA is arranged to arbitrate transactions of the particular transaction types received from a respective requestor. The transactions sent by a given requestor can include various types of transactions, which can be broadly classified as either Blocking or Non-Blocking. Other such attributes, which can be orthogonal to the category of blocking/non-blocking can be classified by attributes such as thread, response, or other such attributes suitable for arbitration, scheduling, or other prioritization activities for ordering the progress of transactions through the pipeline 600. Such arbitration can be customized in response to the type of requestor and the type of transactions that are sent from a particular requestor (including a particular kind of requestor).

Each of the RAU units is a blocking (e.g., selectively blocking) unit, so that any and all transactions can be selectively (and temporarily) stalled at and by a respective RAU unit, for example, in response to the next following (e.g., downstream) pipe stage being stalled.

Types of transactions that can be arbitrated (e.g., selectively arbitrated) by the RAU include: 1) blocking reads and writes (e.g., including transactions such as data loads and stores, code fetches, and streaming engine reads), where such transactions can be stalled behind (e.g., stalled in response to a determination that the transaction has a lower priority than) non-blocking transactions or non-blocking responses; 2) non-blocking writes (e.g., including transactions from transferring L1D victims from a local CPU or from a different core having a line cached in the local memory system), where such transactions are arbitrated against other non-blocking and response transactions based on coherency rules; 3) non-blocking snoops (e.g., snoops from MSMC), which are arbitrated against other non-blocking and response transactions based on coherency rules; 4) responses (e.g., responses such as responses to a read or cache line allocate transaction sent out to MSMC, or for a snoop sent to L1D), where the responses are arbitrated against other non-blocking and response transactions based on coherency rules; and 5) DMA (e.g., DMA transactions that are prioritized as being associated with a different thread of a differing priority), where—as a general rule—DMA transactions can be stalled behind other non-blocking or blocking transactions in cases where arbitration prohibits other cache transactions from blocking any DMA transaction over a relatively long period of time.

Any given requestor is not necessarily required to originate (e.g., issue or send) all possible types of transactions. Described herein following are examples of requestors and the respective arbitration adjudicated by the respective RAU units.

Firstly, the DMC 601 (which can be an L1 data controller) is a requestor that can originate the following types of transactions: a) blocking reads; b) blocking writes; c) non-blocking write (L1D victims); d) non-blocking snoop responses; and e) non-blocking DMA responses (for L1D SRAM). Non-blocking transactions can win arbitration over blocking transactions. Arbitrations between the various non-blocking transaction and non-blocking commands are processed in the order that they arrive (e.g., FIFO). DMA responses that access L1D SRAM are not necessarily required to be arbitrated in response to ordering commands.

Secondly, the PMC 602 (which can be an L1 program controller) is a requestor that can originate only blocking reads (in an example). In various implementations of the example DSP, the read transactions sent from the PMC are processed in order (although an extension of the arbitration control can allow them to be processed out of order).

Thirdly, the SE 603 (streaming engine) is a requestor that can originate blocking reads and CMO (cache maintenance operations) transactions. In various implementations of the example DSP, the read and CMO access transactions from the SE are processed in order (although an extension of the arbitration control can allow them to be processed out of order).

Fourthly, the CMMU 605 (which is a memory management unit) is a requestor that can originate only blocking reads (in an example). In various implementations of the example DSP, the read transactions from the CMMU are processed in order (although an extension of the arbitration control can allow them to be processed out of order).

Fifthly, the MSMC 604 is a requestor that can originate the following types of transactions: a) blocking DMA read; b) blocking DMA write; c) non-blocking write (L1D victims from another core and/or processor); d) non-blocking snoop; and e) non-blocking read response. The non-blocking transactions are weighted to win arbitration over blocking transactions. Arbitration between non-blocking transactions is adjudicated in response to an ordering that can help maintain memory coherency. However, read responses can be arbitrated in any order, because of a lack of a hazard in the ordering of concurrent read responses.

The Level-1 Arbitration (S1 Arb) is coupled to one or more of the outputs of the RAU ELA stage to receive transactions from each requestor, which have been arbitrated by the FIFOs 610. The outputs of RAU can be dynamically selectively coupled and/or structurally coupled to a particular bank selected from paralleled banks coupled in parallel (as described herein following) in response to dynamic conditions such as an address of the transaction, a type of the transactions, and/or be coupled to a particular requestor based on an expected processing load. The 'winning' transaction arbitrated from each requestor are presented to the level-1 arbitration (S1 Arb) for further arbitration. The level-1 arbitration stage includes blocking units, so the transactions pending in the level-1 arbitration unit can be stalled within the RAU stage 1 in the event that a next following pipe stage is stalled.

Bank 630 (e.g., Bank Max) includes the arbiter 631, the arbiter 641, the tag access unit 651, the tag ECC 661, the hit/miss control 671, the L2 RAM data memory 672, the data ECC 673, and the FIFO[1 . . . N] 683. A Bank 1 can include a piped bank that includes the arbiters 632 and 642 as well as other units similar to units in respective stages of Bank Max (630). A Bank 0 can include a piped bank that includes the arbiters 633 and 643 as well as other units similar to units in respective stages of Bank Max (630).

The RAU stage 1 of pipeline 600 includes a row of arbiters, where each of the arbiters 631, 632, and 633 is included as an entry point of a respective banked pipes (each of which banked pipe can—or can be included by—one of the paralleled banks, such as bank 630). The arbiters 631, 632, and 633 are coupled to receive transactions from the outputs of the data path of the RAU ELA (e.g., 621-625), so that the paralleled arbiters can arbitrate the transactions received from the RAU ELAS in parallel. The arbiters 631, 632, and 633 can share information between themselves, so that arbitration of a first arbiter (e.g., 631) can be adjudicated in response to a second arbiter (e.g., 632). Various example configurations of the RAU stage 1 can include one through eight arbitrators, so that one through eight pipes/banks can be arranged to adjudicate arbitration of the received transactions in parallel.

Each of the arbiters of the banks of arbiters in the RAU stage 1 includes various checking devices for adjudicating an arbitration in response to determinations of a set of checks. A result of the arbitration can be that a transaction is allowed to proceed to the next stage (e.g., RAU stage 2) upon successfully completing the checks of the checking devices.

A first check includes determining address hazards. Depending on the type of transaction and the type of the requestor generating the transaction, the address of the request is hazarded to address in the pipeline, and the transactions sent out to external devices (which might require dependent transactions to be stalled). Non-blocking transaction are hazarded against other non-blocking transaction only, while blocking transactions are hazarded against blocking and non-blocking transactions.

A second check includes determining structural and pipeline hazards. The structural and pipeline hazards are a kind of hazards that are dependent on (e.g., caused by limitations of) the pipeline and interface microarchitecture. Hazarding can be performed in situations such as: a) multiple transactions attempting to simultaneously access a same interface (e.g., where one transaction can be a read response for a L1D read generated by a MSMC, and where another transaction can be a read hit for an L1D read, so that the results of both transactions would be ready to be returned to the L1D in the same cycle); b) conflicts between simultaneous accesses to the tag, snoop and MESI RAMs, which can occur because the tag, snoop, and MESI read can be accessed from two different stages in the pipeline; and c) conflicts between the L2 cache and SRAM, which can occur because a multi-phase transaction (such as the read-modify-write transaction) would conflict with a 'winning' transaction for access to the same bank.

A third check includes determining reservation credits. To help reduce the interaction (e.g., adverse interaction, where external factors could otherwise reduce the efficiency of the internal arbitration) between internal arbitration and external credits (from other modules), the UMC is arranged to selectively issue (e.g., "consume") reservation credits from a pool of) reservation credits from a pool of reservation credits and to spend (e.g., "release" the reservation credits back to the pool). The reservation credits from the pool of reservation credits are consumed and released internally to the pipeline 600. In an example, the pool of reservation credits includes the depths of each of the exit FIFOs of the P4 pipe stage. The third check can include determining an amount of reservation credits to be consumed for each transaction in response to the type of requestor and the type of transaction.

Examples of reservation credits include: a) read allocate command credit (e.g., where the reservation credits can be consumed from the reservation credit pool when space is available in the P4 pipe stage "to exit" a read allocate command from the pipeline 600); b) write allocate command and date credit (e.g., where space is available in the P4 pipe stage for exiting a write allocate command, and where space is available for the write data to be held so that write data can be merged later); c) write command credit (e.g., where space is available in the P4 pipe stage for exiting a non-allocating write command); d) L1D victim (e.g., where space is available in the P4 pipe stage for exiting the L1D victim command and data); e) L2 victims (e.g., where space is available in the P4 pipe stage for exiting the L2 victim command and data); f) snoop (e.g., where space is available in the snoop response queue in the event a response is to be generated, and where space is available in the snoop queue in the P4 stage in the event a snoop is to be sent to L1D); g) DMA to L2SRAM (e.g., where space is available in the DMA response queue in the event a response is to be generated, and also where space is available in the snoop queue in the P4 stage in the event a snoop is to be sent to L1D in response to the DMA transaction); h) DMA to L1DSRAM (e.g., where space is available in the DMA queue P4 stage, which is where the DMA transaction results are to be forwarded to DMC); and i) read response to L1D (e.g., for reads that hit the L2 cache or are for reading the L2SRAM, the read data could be stalled by the DMC: to prevent stalls resulting from the read responses to L1D from backing up the entire pipeline, a separate read response FIFO (not shown) can be include to queue a sequence of the read responses, and the read response FIFO can be couple to each of (e.g., shared by) each of the banked pipes).

Regarding Level-2 Arbitration (S2 Arb), each requestor (e.g., the DMC 601, the PMC 602, the SE 603, the MSMC 604, and the CMMU 605) can have one or more transaction(s) which is (are) eligible for final arbitration and entry into (e.g., a banked pipe of) a non-blocking RAU stage 2 of the pipeline 600. In various examples, each transaction for each requestor is separately arbitrated, or multiple transactions from each requestor can be commonly arbitrated.

The RAU stage 2 of pipeline 600 includes a bank of arbiters, such as arbiters 641, 642, and 643. The arbiters 641, 642, and 643 are coupled to receive transactions from the respective outputs of arbiters 631, 632, and 633.

The second level of arbitration (e.g., RAU stage 2) is a non-blocking section of the pipeline, so that each banked pipe continues to determine a sequence of arbitration winners, so that no transaction can stall indefinitely. As described hereinbelow, a combination of fixed and dynamic arbitration is arranged to prevent indefinite stalls.

A first arbitration competition can exist between requestors in a first group of two requestor types including streaming engine reads and including data loads and/or stores. The relative importance of winning for either of these competing transactions can be determined by evaluating the adverse or beneficial effects of the first arbitration competition on the application. To selectively determine the relative importance, a user (e.g., system designer) can program configuration registers (via memory mapping and or extended control registers) to load a bandwidth management counter with a value indicating a relative arbitration priority between the first two requestor types.

A second arbitration competition can exist between requestors in a second group of two requestor types including a first output port and a second output port, where both are output ports of the same streaming engine. In addition to the two streaming engines with separate ports shown in the example pipeline 600, other pipeline examples can include a single streaming engine that shares the two ports among two or more streams. Because the UMC might not be signaled to receive the actual stream-to-port mapping of the SE, and because such mapping can be dynamically change, the SE port 0-port 1 relative bandwidth management counter in the memory mapped registers can be programmed by a user, so that (e.g., in response to the user programming) the UMC can determine a relative arbitration between the two ports.

A third arbitration competition can exist between requestors in a third group of two requestor types, where the transactions from the requestors are DMA reads/writes. Such arbitrations can be determined by using counters to manage data traffic resulting from the requested transactions.

Table 7 shows a user portal for accessing the three sets of counters to induce a selected bias in arbitration results (e.g., so that a first application that provides real-time results can run uninterrupted and a second application that provides less-critical results is subjected to more delays than the first application).

| REGID | REGISTER | Register Fields | MSB | LSB | Field Access | Field Reset | Register Description |
|---|---|---|---|---|---|---|---|
| 0x281 | L2CC | RSVD | 63 | 54 | R | 0 | |
| | | SE_BW_CNT | 53 | 51 | RW | 010 | SE0, SE1 Relative Bandwidth Management Counter |
| | | RSVD | 50 | 49 | R | 0 | |
| | | DMA_BW_CNT | 48 | 46 | RW | 011 | DMA Bandwidth Management Counter |
| | | RSVD | 45 | 44 | R | 0 | |
| | | CPU_BW_CNT | 43 | 41 | RW | 011 | CPU (Load/Store) Bandwidth Management Counter |
| | | RSVD | 40 | 38 | R | 0 | |

At the end of the RAU stage 2, each of the banked pipes has a respective unique winning transaction, each of which is then forwarded (e.g., forwarded in response to winning) to the next stages (e.g., the P0-P3 stages) of each of the banked pipes.

Regarding the first four pipe stages (e.g., stages P0-P3 present in each of the banked pipes), the stages P0 through P3 are non-stalling and non-blocking. The non-stalling design helps to avoid transaction stalls in the P0-P3 stages of the pipeline 600. Each transaction admitted to the P0-P3 stages is processed in 1 or 2 cycles by the stages, and each such admitted transaction can have guaranteed slots. Transaction stalls are avoided because the arbitration before P0 (e.g., in RAU stages 1 and 2) has ensured that a sufficient bandwidth remains in the P0-P3 stages (as well as in the downstream portions therefrom of the pipeline 600), so that each winning transaction entering stage P0—and for any secondary transactions that each winning transaction might respectively generate—can be subsequently processed by at least stages P1-P3 without stalling.

The example functionality of stage P0 (pipe stage 0) includes credit management and cache and SRAM functionality as described herein following.

The credit management functionality of stage P0 includes managing the consumption of the reservation credits described herein with respect to the S1 arbitration. As described hereinbelow with reference to Table 8, an appropriate set of reservation credits are consumed in stage P0 and released in a later stage. The consumption of various kinds of reservation credits in stage P0 is described herein following.

A read allocate command reservation credit is consumed for any read that can potentially create a miss to MSMC. Because the tag, MESI or snoop RAMs have not been evaluated in stage P0, the hit/miss evaluation results are not necessarily available here, and the consumption of this credit is based on other factors. The other factors can include: 1) determining whether the line is cacheable for reads and writes; 2) determining whether the line could potentially require a snoop transaction, e.g., where the line was marked cacheable and shareable; 3) determining whether the address of the transaction points to an endpoint that has different coherency requirements; and 4) determining whether one of the requestors (e.g., of the transactions being arbitrated) is able to generate snoop transactions.

A write allocate command and data reservation credit is consumed for any write that can potentially write allocate and create a miss to MSMC. Because the tag or MESI RAMs are not evaluated in stage P0, the hit/miss evaluation results might not be available at stage P0, so that the consumption of this credit is based on other factors (such as the factors described hereinabove).

A write command credit is an example reservation credit that is consumed for any write that can potentially miss the cache, is not write allocated, and is to be sent out as a write miss to the MSMC. Because the tag or MESI RAMs are not evaluated in stage P0, the hit/miss evaluation results are not necessarily available at stage P0, and the consumption of this credit is based on other factors (such as the factors described hereinabove).

An L1D victim reservation credit is consumed for any L1D victim that can potentially miss the cache, where the L1D victim, as a result of the cache miss, is to be sent out to the MSMC. Because the tag or MESI RAMs are not evaluated in stage P0, the hit/miss evaluation results might not be available at stage P0, and the consumption of this credit is based on other factors (such as the factors described hereinabove).

An L2 victim reservation credit is consumed for any read or write that can potentially create a miss to MSMC, so that a dirty line is to be evicted from the L2 cache. Because the tag, MESI or snoop RAMs are not evaluated in stage P0, the hit/miss evaluation results might not be available at stage P0, and the consumption of this credit is based on other factors (such as the factors described hereinabove).

A snoop reservation credit is consumed for any read or write that can potentially create a snoop to L1D. Because the snoop RAM are not evaluated in stage P0, the hit/miss evaluation results might not be available at stage P0, and the consumption of this credit is based on other factors (such as the factors described hereinabove).

A DMA to L2SRAM reservation credit is consumed for any DMA read that does not indicate a snoop to L1D and that can read from the L2SRAM. Because the snoop RAM is not evaluated in stage P0, the hit/miss evaluation results might not be available at stage P0, and the consumption of this credit is based on other factors (such as the factors described hereinabove).

DMA to L1DSRAM: reservation credits need not be consumed for this transaction because space is available in the DMA queue P4 stage (e.g., without necessarily requiring a reservation station in the P4 exit FIFO) and because the DMA transactions can be forwarded to the DMC. The DMA transactions can be forwarded without tag or snoop checks.

A read response to L1D reservation credit is consumed for any read that can potentially read from the L2 cache or L2SRAM and send data back to DMC. Because the tag, MESI or snoop RAMs are not evaluated in stage P0, the hit/miss evaluation results might not be available at stage P0, and the consumption of this credit is based on other factors (such as the factors described hereinabove).

The credit management functionality of stage P0 includes managing the cache and SRAM functionality. The P0 pipe stage includes (or is coupled to) the tag access unit 651. The tag access unit is arranged to preprocess each of the read transactions to be sent to the L2 tag RAM, L2 MESI RAM, snoop shadow tag (L1D), victim shadow tag (L1D Victim cache), and the firewall.

The stage P1 (pipe stage 1) includes cache and SRAM functionality. The stage P1 consumes a pipeline cycle while processing the reads of the various cache-related RAMs listed hereinabove.

The stage P2 (pipe stage 1) includes cache and SRAM functionality. The tag ECC 661 consumes a pipeline cycle while performing ECC detection and correction for verifying data read from the various cache-related RAMs listed above (e.g., for correcting soft errors caused in circuits added by the pipeline 600), and while performing an initial part of the hit/miss determination.

The stage P3 (pipe stage 1) includes credit management functionality. The hit/miss results for both the L2 cache and the L1D shadow cache are determined by the Hit/Miss Control 671, and some of the respective reservation credits are released here by the hit/miss Control 671.

Some of the reservation credits released by the hit/miss control 671 can include: a) read allocate command credit (e.g., in response to a read hitting the L2 cache, the respective reservation credit is released here, because (for example) a miss cannot be generated and sent to the MSMC); b) Write allocate command and date credit (e.g., in response to a write hitting the L2 cache, the respective reservation credit is released here, because (for example) a write allocate miss might not be generated and sent to the MSMC); c) Write command credit (e.g., in response to a write hitting the L2 cache, the respective reservation credit is released here, because (for example) a write miss cannot be generated and sent to the MSMC); d) L1D victim (e.g., in response to an L1D victim hitting the L2 cache, the respective reservation credit is released here, because (for example) the victim cannot be sent to the MSMC); e) L2 victims (e.g., in response to a read or write hitting the L2 cache, the respective reservation credit is released here, because (for example) the L2 victim cannot be generated to the MSMC—if the read or write misses the L2 cache, but the line being replaced is not dirty, then too, the respective reservation credit is released here, because (for example) the L2 victim might not be generated and sent to the MSMC); f) snoop (e.g., in response to the transaction missing the L1D cache (including missing both the main and victim caches), the respective reservation credit is released here, because (for example) a snoop cannot be generated to DMC); g) DMA to L2SRAM (e.g., in response to the transaction hitting the L1D cache (including hitting both the main and victim caches), the respective reservation credit is released here, because (for example) a snoop can be sent to the DMC); h) DMA to L1DSRAM (e.g., a respective reservation credit is not released here); and i) read response to L1D (e.g., a respective reservation credit).

The stage P3 (pipe stage 1) includes cache and SRAM functionality. The hit/miss control 671 continues processing of the hit/miss evaluation, and—in at least some cases—can generate the final result for both the L2 cache and the L1D snoop filters. In response to the final result for both the L2 cache and the L1D snoop filters, the stage P3 can also perform initialization functions such as setting up the cache accesses for subsequent hits, L2SRAM access, commands for miss, error status, and exceptions.

The L2 RAM data memory 672 is coupled to receive transactions from the stage P3 and to forward data retrieved in response to the transactions received from the stage P3 to the Data ECC 673. The transactions received from the hit/miss control 671 of the stage P3 can bypass the L2 RAM data memory 672 by traversing the L2VCT (level-2 victim generated by an L2 cache miss) path to reach the cache miss 681 in the stage P4, by traversing the SRAM bypass-cache miss path to reach the cache miss 681 in the stage P4, and by traversing the SRAM bypass snoop path to reach the snoop 682 in the stage P4.

The stage P4 is a final portion of the full pipeline (e.g., stages P0-P4, as well as pipeline 600): the stage P4 is blocking, while the stages P0-P3 are non-blocking. The stage P4 includes FIFO and other storage buffers that help isolate the frontend of the pipeline from the external interfaces, and the external credits that are applied to those interfaces. Commands that enter stage P0 are guaranteed an entry (e.g., without being blocked) into an exit FIFO entry in stage P4, but the rate at which the FIFO-entered transactions are retired from these the stage P4 FIFOs is dependent upon on the stages after P4 and external credits.

MSMC (e.g., cache and misses) and DMC (snoop, DMA to L1DSRAM) sets of transactions and reservation credits are handled independently of the handling of reservation credits consumed and released for other kinds of transactions. For example, any outputs of the stage P4 of the pipeline can be independently coupled to a selected input of the master arbiter for MSMC transactions 691 or to a selected input of the master arbiter for DMC transactions 692.

Regarding reservation credit management, all the consumed reservation credits can be released in the P4 stage (so that the reservation credit is recycled to the reservation credit pool), so that the transaction can proceed to the next stage, and eventually to the endpoint (e.g., the MSMC or the DMC).

Although the P4 stage can be a blocking stage, in some conditions, the blocking transactions might not be allowed to block a non-blocking transaction. An example of such a blocking condition could be a case in which a blocking read is not allowed to proceed due to there being insufficient reservation credits available for the UMC (Universal Memory Controller)-MSMC interface. In such a case, a L1D victim or L2 victim would be allowed to be sent out when the required reservation credits (non-blocking reservation credits) are present on the UMC-MSMC interface. Determining whether sufficient credits are available is managed by a state machine (not explicitly shown) that monitors the availability of external credits available from the UMC-MSMC interfaces, monitors the availability of external credits available on the DMA/snoop pipe stage (e.g., the next stage), and arbitrates between the different exits FIFOs of a bank, so that more reservation credits can be consumed than would otherwise be available to guarantee sufficient resources using only the (internal) reservation credits.

The cache miss, snoop arbitration and send stage is a common stage that receives and forwards transactions received from all banked pipes (e.g., the outputs of each banked pipes). The cache miss, snoop arbitration and send stage includes the master arbiter for MSMC transactions 691 and the master arbiter for DMC transactions 692. Transactions from any pipe that are destined for transmission to the MSMC can be arbitrated by the master arbiter for MSMC transactions 691, so that the arbitration for such transactions is isolated and independent from the arbitration for the transactions from any pipe that are intended for DMC. The cache miss, snoop arbitration and send stage evaluates the type and number of external credits required to send a particular transaction out to the endpoint (MSMC or DMC) based on the transaction type and arbitrates one transaction from the pipes that can be sent to external devices.

In an example pipeline 600, the FIFO[1 ... N] 683 is a set of banked pipe exit FIFOs in the stage P4. Each of the exit FIFOs has a respective depth of reservation stations (e.g., "slots") in which it can temporarily buffer a sequence of received transactions. The number of reservation stations in a particular exit FIFO determines the number of reservation credits available for the given FIFO. For each exit FIFO in FIFO[1 ... N] 683, there is a respective counter in counters[1 ... N] 609. The number of maximum reservation credits for a selected FIFO can be loaded into the respective reservation counter to initialize the reservation counter. Table 8 shows example transaction assignments and reservation credits for associated pairs of reservation counters and exit FIFOs.

TABLE 8

| FIFO | RESERVATION COUNTER | Used for | Starting Value (Maximum Value) |
|---|---|---|---|
| FIFO_A | COUNTER_A | Read and Write Commands to MSMC | 16 |
| FIFO_B | COUNTER_B | Write Data to MSMC | 4 |
| FIFO_C | COUNTER_C | L2 Victim Data to MSMC | 4 |
| FIFO_D | COUNTER_D | L1D Victim Data to MSMC | 4 |
| FIFO_E | COUNTER_E | Snoop Response to MSMC | 2 |
| FIFO_F | COUNTER_F | DMA Read Response to MSMC | 4 |
| FIFO_G | COUNTER_G | Snoop Command to DMC | 4 |
| FIFO_H | COUNTER_H | DMA Command to DMC | 4 |
| FIFO_I | COUNTER_I | DMA Write Data to DMC | 2 |

Each entry stored in a respective FIFO can be in one of 4 states: unoccupied state, in which the reservation counter value is equal to the starting value; a reserved but not occupied state, in which the reservation counter value is smaller than the starting value; an occupied (and reserved) state, in which the reservation counter value is smaller than the starting value; and a full state, in which the reservation counter value has a value of zero.

The arbitration for the transactions stored in the exit FIFOs is performed in response to reservation credit actions, which can "consume" reservation credits (e.g., in response to the number of reservation stations as indicated by the respective depths of the exit FIFOs) or "release" reservation credits (e.g., the reservation credits that have previously been consumed).

The consumption of reservation credits can occur in response to a reservation being made for storing a transaction entry in a particular exit FIFO. The reservation counter associated with the particular exit FIFO can be decremented in response to the reservation credit being consumed, such that the availability of open reservation stations in the particular exit FIFO can be tracked. At this point in the "reservation credit cycle," the transaction entry has not necessarily yet been pushed into reservation station of the particular exit FIFO; the consumption of the reservation credit indicates the formerly open reservation station has been reserved and is (until released) not available to accept a reservation. Accordingly, a credit count is decremented in response to a respective consumption of a reservation credit.

The release of reservation credits can occur in response to a transaction entry being "popped" from (e.g., made to exit) the particular FIFO, so that the formerly entered transaction entry is no longer being stored in the FIFO. Accordingly, the reservation credit count in the associated reservation credit counter is incremented in response to the respective release of a reservation credit.

The pipeline 600 includes blocking stages, which allow types of transactions having lower priority to be held (e.g., temporarily stalled), while types of transactions having higher priority are allowed to proceed in favor of the transaction types having lower priorities. Additionally, different transaction types can require different amounts of reservation credits, where an amount of reservation credits to be consumed can be determined in response to an amount of reservation credits that is associated with a particular type of transaction. In an example arbitration described herein following, a transaction is allowed to proceed if and only if all the required credit types have counter values greater than zero (e.g., which indicates that the respective FIFO for the reservation counter is not in the full state).

In the example arbitration, a transaction enters the RAU stage 2. The entering transaction is an example transaction, where the transaction is an SE (streaming engine) coherent and cacheable read transaction having an endpoint that is outside of the L2 cache controller. The type of the entering transaction indicates that it is anticipated that fulfilling the entering transaction will (e.g., will likely) require at least one of three actions. Determining which action of the three actions is to be taken can be determined in response to determining where and how the address memory (e.g., indicated by the entering transaction) is cached.

The following actions (e.g., if performed) would require a query to a memory (e.g., tag RAM, or other cache management memory), so that prediction of the eventual action taken cannot be determined by the time (e.g., by the end of the present pipe cycle) this transaction is advanced from the S2 Arbitration (e.g., RAU stage 2) pipe stage to the next pipe stage (e.g., pipe stage P0). As a first potential action, a snoop L1D would be performed if the line had been already cached in L1D. Such a state can be determined by a cache hit in the shadow copy of the L1D TAGS. As a second potential action, a cache inquiry would indicate that the line is a miss. As a third potential action, a L2 victim transaction would be performed if the line is a miss, and a space for the L2 Victim would be allocated, and the line from the cache that is being replaced would be marked as dirty.

The SE coherent and cacheable read transaction will 'win' arbitration and advance to the next pipe stage if and only if the following reservation counters are greater than 0:

$$\text{if (CREDIT}\_A{>}0\text{) and (CREDIT}\_C{>}0\text{) and (CREDIT}\_G{>}0\text{) then proceed} \quad (1)$$

Reservation credit actions in RAU stage 2 include:

$$\text{Consume credit CREDIT}\_G \text{ (Decrement CREDIT}\_G \text{ counter)} \quad (2)$$

for a potential snoop read to DMC, $$\text{Consume credit CREDIT}\_A \text{ (Decrement CREDIT}\_A \text{ counter)} \quad (3)$$

for a potential Read Miss to MSMC, and $$\text{Consume credit CREDIT}\_C \text{ (Decrement CREDIT}\_C \text{ counter)} \quad (4)$$

for a potential L2 victim to MSMC transaction. Accordingly, the reservation credits for FIFO[G], FIFO[A], and FIFO[C] have all been decremented. In the example, the credit counters A, C, and G are reservation credit counters and the credits consumed (or released) are reservation credits.

Table 9 shows example results of the SE coherent and cacheable read transactions at pipe stage 3 (e.g., hit/miss control 671) that can result as a function of the tag hit/miss results.

TABLE 9

| L1 Shadow TAGS | L2 Cache TAGS | Action | Results |
|---|---|---|---|
| Hit | — | Release CREDIT_A and CREDIT C 2. No change to CREDIT_G | Snoop will be generated, and Cache Miss will NOT be generated |
| Miss | Hit | Release CREDIT_A, CREDIT_C and CREDIT_G | No Snoop or Cache Miss will be generated |
| Miss | Miss - existing line is NOT Dirty | Release CREDIT_C, and CREDIT_G | No Snoop will be generated. Cache Miss will be generated, but L2 Victim will not be generated |
| Miss | Miss - Existing line is Dirty | Release CREDIT_G | No Snoop will be generated. Cache Miss and L2 Victim will be generated |

Depending on the outcomes of the hit/miss check at pipe stage P3, one of the exit FIFOs will receive a generated transaction. If the Transaction requires a snoop, the snoop command is generated and pushed into FIFO_G, and COUNTER_G is not updated (yet). If the Transaction requires a cache miss, that miss command is generated and pushed into FIFO_A and COUNTER_A is not updated (yet). If the Transaction requires an L2 victim, the victim command is generated and pushed into FIFO_C and COUNTER_C is not updated (yet).

Because the pipe stage 3 is non-blocking, the transaction is advanced to pipe stage P4 for further processing. If the transaction advanced to the P4 stage requires a snoop to be generated AND the P4 stage is able to advance the transaction to the stage "master ARB for DMC transaction" pipe stage, the credit COUNTER_G is released (incremented). If the transaction advanced to the P4 stage requires a cache miss to be generated AND the P4 stage is able to advance the transaction to the stage "master ARB for MDMA transaction" pipe stage, the credit COUNTER_A is released (incremented). If the transaction requires a L2 Victim to be generated AND the P4 stage is able to advance the transaction to the stage "master ARB for MDMA presentation" pipe stage, the credit COUNTER_C is released (incremented). At the end of the processing at stage P4, the reservation credit counters G, A, and C have all been incremented, so that each of the reservation credits previously consumed in RAU stage 2 have been released and the values of the respective counters have been restored to their respective starting values.

In a first example, a system comprises: a cache that includes: a local memory that includes a set of cache lines to store data; and a multi-banked pipeline coupled to access the set of cache lines of the local memory, wherein the multi-banked pipeline includes: a first banked pipe configured to receive first banked transaction requests from a first requestor for access to the local memory; and a second banked pipe configured to receive second banked transaction requests from a second requestor for access to the local memory, wherein the second requestor is heterogeneous with respect to the first requestor, and wherein the first banked transaction requests are processed by the first banked pipe at a same time as the second banked transaction requests are processed by the second banked pipe.

The first banked pipe can include a first banked blocking arbiter that is arranged to temporarily block and reorder the first banked transaction requests in the first banked pipe, and the second banked pipe can include a second banked blocking arbiter that is arranged to temporarily block and reorder the second banked transaction requests in the second banked pipe.

The first banked blocking arbiter can be arranged to award priority to non-blocking transactions, so that in response to the awarded priority, a blocking first transaction is held at a blocking stage of the first banked pipe and a first non-blocking transaction is passed to a stage following the blocking stage without being held at the blocking stage.

The first banked blocking arbiter can be arranged to award priority in response to a value of a pool of reservation credits available to process a type of one of the first banked transaction requests, wherein the reservation credits of the pool of reservation credits initially indicate an amount of reservation stations of the first banked pipe to process the one of the first banked transaction requests.

The system can further comprise a counter arranged to change the value of the pool of reservation credits in response to a reservation credit awarded by the first banked blocking arbiter to one of the first banked transaction requests. The counter can be arranged to restore the value of the pool of reservation credits in response to a release of the reservation credit. The reservation credit can indicate an availability of a reservation station. The reservation station can be a slot in an exit FIFO of the multi-banked pipeline.

The cache can be a second level cache, the local memory can be a second level memory, and the set of cache lines can be a second level set of cache lines, and the system can further comprise: a central processing unit (CPU) coupled to the second level cache and arranged to execute program instructions to manipulate data; and a first level cache that includes a local memory that includes a set of cache lines to store data.

The one of the first banked transaction requests can includes a first requestor selected from one of an L1P (level-1 program cache), an L1D (level-1 data cache), a MSMC (multicore shared memory controller), a MMU (memory map unit), and an SE (streaming engine), and where one of the second banked transaction requests can include a second requestor that is different from the first requestor.

The one of the first banked transaction requests can include a first transaction type selected from one of a first level cache fetch, a first level cache load and/or store, an L3 (level-3) DMA (direct memory access) to the second level cache or the first level cache, an L3 snoop, an L3 CacheWarm, a page translation, streaming data from at least two ports, and cache coherency/maintenance operations, and where one of the second banked transaction requests can include a second transaction type that is different from the first transaction type.

The one of the first banked transaction requests can include a first destination selected from one of a include L2

(level-2) SRAM (static RAM), L1D (Level-1 data cache) SRAM, L2 (level-2) Cache, MSMC (multicore shared memory controller) SRAM, L3 (level-3) Cache, and memory addressable by the CPU that is other than L1, L2, and L3 cache memory, and where one of the second banked transaction requests can include a second destination that is different from the first destination.

The first level cache and the second level cache can be kept coherent in response to one of the first banked transaction requests including a first transaction type of a cache maintenance operation. The first banked pipe can further include an ECC (electronic correction code) unit that is coupled between a first structure of the first banked pipe and a second structure of the first banked pipe.

In a second example, an apparatus comprises: a central processing unit (CPU) arranged to execute program instructions to manipulate data; a first level cache coupled to the CPU to temporarily store data in first level cache lines for manipulation by the CPU, where the first level cache includes a first level local memory addressable by the CPU; and a second level cache coupled to the first level cache to temporarily store data in second level cache lines for manipulation by the CPU, wherein the second level cache includes a second level local memory addressable by the CPU, wherein the second level cache includes a multi-banked pipeline that includes a first banked pipe configured to receive first banked transaction requests from a first requestor for access to the second level local memory, wherein the second level cache includes a multi-banked pipeline that includes a second banked pipe configured to receive second banked transaction requests from a second requestor for access to the second level local memory, wherein the first banked pipe includes a first banked blocking arbiter that is arranged to temporarily block and reorder the first banked transaction requests in the first banked pipe, and wherein the second banked pipe includes a second banked blocking arbiter that is arranged to temporarily block and reorder the second banked transaction requests in the second banked pipe, wherein the first banked blocking arbiter is arranged to award priority in response to reservation credits available to process a type of one of the first banked transaction requests, and wherein the reservation credits initially indicate an amount of reservation stations to process the one of the first banked transaction requests. The apparatus of can further comprise a counter arranged to change in response to a first banked pipe clock a reservation credit of the one of the first banked transaction requests.

The second requestor can be heterogeneous with respect to the first requestor, and wherein the first banked transaction requests are processed by the first banked pipe at a same time as the second banked transaction requests are processed by the second banked pipe.

In a third example, a method, comprises: receiving, at a first banked pipe of a multi-banked pipe that includes a second banked pipe coupled in parallel to the first banked pipe, a first transaction request from a first requestor for access to a local memory that includes a set of cache lines to store data; and receiving, at the first banked pipe of the multi-banked pipe, a second transaction request from a second requestor for access to the local memory that includes the set of cache lines to store data, wherein the second requestor is heterogeneous with respect to the first requestor, wherein the first banked transaction request is a first type of transaction request that is different from a second type of the second transaction request, and wherein the first and second transaction requests are processed by the first banked pipe at a same time. The method can further comprise blocking by a first banked blocking arbiter the first transaction and awarding, by the first banked blocking arbiter, priority to the second transaction, wherein the awarding priority is granted in response to a comparison of a type of the first requester against a type of the second requester. The method can further comprise blocking by a first banked blocking arbiter the first transaction and awarding, by the first banked blocking arbiter, priority to the second transaction, wherein the awarding priority is granted in response to a comparison of the type of the first transaction against the type of the second transaction.

Modifications are possible in the described embodiments, and other embodiments are possible, within the scope of the claims.

What is claimed is:

1. A system, comprising:
    a cache that includes:
        a local memory that includes a set of cache lines to store data, wherein the set of cache lines are arranged in a set of banks;
        a first extended local arbitration unit configured to:
            couple to a first requestor;
            receive a first set of banked transaction requests from the first requestor; and
            perform a first arbitration on the first set of banked transaction requests;
        a second extended local arbitration unit configured to:
            couple to a second requestor that is different from the first requestor;
            receive a second set of banked transaction requests from the second requestor; and
            perform a first arbitration on the second set of banked transaction requests; and
        a multi-banked pipeline coupled to the first extended local arbitration unit, the second extended local arbitration unit, and the set of cache lines of the local memory, wherein the multi-banked pipeline includes:
            a first banked pipe configured to receive the first set of banked transaction requests from the first requestor via the first extended local arbitration unit, wherein the first banked pipe includes a first arbiter configured to perform a second arbitration on the first set of banked transaction requests; and
            a second banked pipe configured to receive the second set of banked transaction requests from the second requestor via the second extended local arbitration unit, wherein the second banked pipe includes a second arbiter configured to perform a second arbitration on the second set of banked transaction requests and wherein the first set of banked transaction requests are processed by the first banked pipe concurrently with the second set of banked transaction requests being processed by the second banked pipe.

2. The system of claim 1, wherein the first arbiter is configured to temporarily block and reorder the first set of banked transaction requests in the first banked pipe, and wherein the second arbiter is configured to temporarily block and reorder the second set of banked transaction requests in the second banked pipe.

3. The system of claim 2, wherein the first arbiter is configured to award priority to non-blocking transactions, so that in response to the awarded priority, a blocking first transaction is held at a blocking stage of the first banked pipe and a first non-blocking transaction is passed to a stage following the blocking stage without being held at the blocking stage.

4. The system of claim 2, wherein the first arbiter is configured to award priority in response to a value of a pool of reservation credits available to process a type of one of the first set of banked transaction requests, wherein the reservation credits of the pool of reservation credits initially indicate an amount of reservation stations of the first banked pipe to process the one of the first set of banked transaction requests.

5. The system of claim 4, further comprising a counter configured to change the value of the pool of reservation credits in response to a reservation credit awarded by the first arbiter to one of the first set of banked transaction requests.

6. The system of claim 5, wherein the counter is configured to restore the value of the pool of reservation credits in response to a release of the reservation credit.

7. The system of claim 6, wherein the reservation credit indicates an availability of a reservation station.

8. The system of claim 7, wherein the reservation station is a slot in an exit FIFO of the multi-banked pipeline.

9. The system of claim 1, wherein the cache is a second level cache, the local memory is a second level memory, and the set of cache lines is a second level set of cache lines, wherein the system further comprises:
a central processing unit (CPU) coupled to the second level cache and configured to execute program instructions to manipulate data; and
a first level cache that includes a local memory that includes a set of cache lines to store data.

10. The system of claim 9, wherein one of the first set of banked transaction requests includes a first requestor selected from one of an L1P (level-1 program cache), an L1D (level-1 data cache), a MSMC (multicore shared memory controller), a MMU (memory map unit), and an SE (streaming engine), and wherein one of the second set of banked transaction requests includes a second requestor that is heterogenous with respect to the first requestor.

11. The system of claim 9, wherein one of the first set of banked transaction requests includes a first transaction type selected from one of a first level cache fetch, a first level cache load and/or store, an L3 (level-3) DMA (direct memory access) to the second level cache or the first level cache, an L3 snoop, an L3 CacheWarm, a page translation, streaming data from at least two ports, and cache coherency/maintenance operations, and wherein one of the second set of banked transaction requests includes a second transaction type that is different from the first transaction type.

12. The system of claim 9, wherein one of the first set of banked transaction requests includes a first destination selected from one of a include L2 (level-2) SRAM (static RAM), L1D (Level-1 data cache) SRAM, L2 (level-2) Cache, MSMC (multicore shared memory controller) SRAM, L3 (level-3) Cache, and memory addressable by the CPU that is other than L1, L2, and L3 cache memory, and wherein one of the second set of banked transaction requests includes a second destination that is different from the first destination.

13. The system of claim 9, wherein the first level cache and the second level cache are kept coherent in response to one of the first set of banked transaction requests including a first transaction type of a cache maintenance operation.

14. The system of claim 1, wherein the first banked pipe further includes an ECC (electronic correction code) unit that is coupled between a first structure of the first banked pipe and a second structure of the first banked pipe.

15. An apparatus, comprising:
a central processing unit (CPU) arranged to execute program instructions to manipulate data;
a first level cache coupled to the CPU to temporarily store data in first level cache lines for manipulation by the CPU, wherein the first level cache includes a first level local memory addressable by the CPU; and
a second level cache coupled to the first level cache to temporarily store data in second level cache lines for manipulation by the CPU, wherein the second level cache includes a second level local memory addressable by the CPU, wherein the second level cache includes a first multi-banked pipeline that includes a first banked pipe configured to receive first banked transaction requests from a first requestor for access to the second level local memory, wherein the second level cache includes a second multi-banked pipeline that is different from the first multi-banked pipeline and that includes a second banked pipe configured to receive second banked transaction requests from a second requestor for access to the second level local memory, wherein the first banked pipe includes a first banked blocking arbiter that is arranged to temporarily block and reorder the first banked transaction requests in the first banked pipe, and wherein the second banked pipe includes a second banked blocking arbiter that is arranged to temporarily block and reorder the second banked transaction requests in the second banked pipe, wherein the first banked blocking arbiter is arranged to award priority in response to reservation credits available to process a type of one of the first banked transaction requests, and wherein the reservation credits initially indicate an amount of reservation stations to process the one of the first banked transaction requests.

16. The apparatus of claim 15, further comprising a counter arranged to change in response to a first banked pipe clock a reservation credit of the one of the first banked transaction requests.

17. The apparatus of claim 16, wherein the second requestor is heterogeneous with respect to the first requestor, and wherein the first banked transaction requests are processed by the first banked pipe at a same time as the second banked transaction requests are processed by the second banked pipe.

18. A method, comprising:
receiving, by a first local arbitrator, a first set of transactions that includes a first transaction request from a first requestor for access to a local memory that includes a set of cache lines to store data;
performing, by the first local arbitrator, a first arbitration on the first set of transactions;
thereafter, providing the first set of transactions to a first banked pipe of a multi-banked pipe that includes a second banked pipe coupled in parallel to the first banked pipe;
receiving, by a second local arbitrator, a second set of transactions that includes a second transaction request from a second requestor for access to the local memory;
performing, by the second local arbitrator, a second arbitration on the second set of transactions; and
thereafter, providing the second set of transactions to the first banked pipe of the multi-banked pipe, wherein the second the local memory that includes the set of cache lines to store data, wherein the second requestor is heterogeneous with respect to the first requestor, wherein the first transaction request is a first type of transaction request that is different from a second type of the second transaction request, and wherein the first and second transaction requests are processed by the first banked pipe concurrently.

19. The method of claim 18, further comprising blocking by a first banked blocking arbiter the first transaction request and awarding, by the first banked blocking arbiter, priority to the second transaction request, wherein the awarding priority is granted in response to a comparison of a type of the first requestor against a type of the second requestor requester.

20. The method of claim 18, further comprising blocking by a first banked blocking arbiter the first transaction request and awarding, by the first banked blocking arbiter, priority to the second transaction, wherein the awarding priority is granted in response to a comparison of the type of the first transaction request against the type of the second transaction request.

21. A system, comprising:
a cache that includes:
   a local memory that includes a set of cache lines to store data; and
   a multi-banked pipeline coupled to access the set of cache lines of the local memory, wherein the multi-banked pipeline includes:
      a first banked pipe configured to receive first banked transaction requests from a first requestor for access to the local memory; and
      a second banked pipe configured to receive second banked transaction requests from a second requestor for access to the local memory; wherein:
   the second requestor is different from the first requestor;
   the first banked transaction requests are processed by the first banked pipe at a same time as the second banked transaction requests are processed by the second banked pipe;
   the first banked pipe includes a first banked blocking arbiter that is configured to temporarily block and reorder the first banked transaction requests in the first banked pipe;
   the second banked pipe includes a second banked blocking arbiter that is configured to temporarily block and reorder the second banked transaction requests in the second banked pipe; and
   the first banked blocking arbiter is configured to award priority to non-blocking transactions, so that in response to the awarded priority, a blocking first transaction is held at a blocking stage of the first banked pipe and a first non-blocking transaction is passed to a stage following the blocking stage without being held at the blocking stage.

* * * * *